(12) United States Patent
Sakamoto et al.

(10) Patent No.: US 7,934,168 B2
(45) Date of Patent: Apr. 26, 2011

(54) STORAGE MEDIUM STORING PROGRAM AND INFORMATION PROCESSING APPARATUS

(75) Inventors: Yoshio Sakamoto, Kyoto (JP); Kaoru Kita, Kyoto (KR)

(73) Assignee: Nintendo Co., Ltd., Kyoto (JP)

( * ) Notice: Subject to any disclaimer, the term of this patent is extended or adjusted under 35 U.S.C. 154(b) by 542 days.

(21) Appl. No.: 12/081,735

(22) Filed: Apr. 21, 2008

(65) Prior Publication Data

US 2009/0064022 A1     Mar. 5, 2009

(30) Foreign Application Priority Data

Aug. 28, 2007   (JP) ................................ 2007-220485

(51) Int. Cl.
*G06F 3/048* (2006.01)
(52) U.S. Cl. ......... 715/822; 715/810; 715/767; 715/821
(58) Field of Classification Search .................. 715/700, 715/708, 709, 764, 765, 767, 769, 772, 781, 715/783, 803, 804, 805, 810, 817, 821, 822, 823, 835, 863; 345/156, 173, 179
See application file for complete search history.

(56) References Cited

U.S. PATENT DOCUMENTS

2009/0210910 A1*   8/2009   Smith et al. ..................... 725/56

FOREIGN PATENT DOCUMENTS

JP          06-266930          9/1994

* cited by examiner

*Primary Examiner* — Xiomar Bautista
(74) *Attorney, Agent, or Firm* — Nixon & Vanderhye P.C.

(57) ABSTRACT

An information processing apparatus includes an LCD and a touch panel, for example. On the LCD, a plurality of operation items making up of a series of operating procedures by means of a touch panel are displayed, and a current operation item out of them is highlight. Whether or not the current operation item is executed is determined on the basis of coordinate data via the touch panel, and whether or not a state attained by execution of a previous operation item has not been maintained is determined. In a case that it is determined that the previous operation item has not been maintained, the display of the current operation item is changed to a normal manner.

6 Claims, 14 Drawing Sheets

FIG. 8

OPERATION DEFINITION DATA

| PROCESSING ID | PROCESSING ORDER | FORWARD CONDITION | BACKWARD CONDITION | MESSAGE |
|---|---|---|---|---|
| P01 | 1 | D01 | | TOUCH CARD YOU WANT TO ARRANGE |
| P01 | 2 | D04 | D03 | SLIDE THE CARD TO PLACE WHERE YOU WANT TO ARRANGE |
| P01 | 3 | D02 | D05 | TOUCH OFF TOUCH PEN. |
| P02 | 1 | .... | .... | .... |
| P02 | 2 | .... | .... | .... |
| P02 | 3 | .... | .... | .... |
| P02 | 4 | .... | .... | .... |
| ⋮ | ⋮ | ⋮ | ⋮ | ⋮ |

FIG. 9

CONDITION DATA

| DATA ID | OPERATION KIND | OPERATION AREA 1 | OPERATION AREA 2 | .... |
|---|---|---|---|---|
| D01 | TOUCH ON | (10, 120) - (30, 140) | (40, 120) - (60, 140) | .... |
| D02 | TOUCH OFF | (20, 60) - (40, 80) | (20, 90) - (40, 110) | |
| D03 | TOUCH OFF | (0, 0) - (19, 60) | (41, 60) - (160, 140) | .... |
| D04 | SLIDE | (20, 60) - (40, 80) | (20, 90) - (40, 110) | |
| D05 | SLIDE | (0, 0) - (19, 60) | (41, 60) - (160, 140) | .... |
| ⋮ | ⋮ | ⋮ | ⋮ | ⋮ |

US 7,934,168 B2

STORAGE MEDIUM STORING PROGRAM AND INFORMATION PROCESSING APPARATUS

CROSS REFERENCE OF RELATED APPLICATION

The disclosure of Japanese Patent Application No. 2007-220485 is incorporated herein by reference.

BACKGROUND OF THE INVENTION

1. Field of the Invention

The present invention relates to a storage medium storing a program and an information processing apparatus. More specifically, the present invention relates to a storage medium storing a program and an information processing apparatus for displaying a plurality of operation items being made up of a series of operating procedures to be performed by a user.

2. Description of the Related Art

Conventionally, as a consumer transaction facility, one which displays input procedures of input items, and displays a state of progress of the input operation every time that an input operation is performed is known.

One example of a related art of such a kind is disclosed in a Patent Document 1 (Japanese Patent Laid-open No. 6-266930 [G07D 9/00, G06F 3/14 15/30]). In a consumer transaction facility in the Patent Document 1, a list of input items required for a transaction is displayed in a form of a flowchart, items which have already been input and items which have not been input yet are differentiated one another in a state of display, and an item which is currently being input is clearly indicated. More specifically, by changing the color of a display of a part of the input procedures which is currently being performed or has been performed, it is possible to inform a current state of the input procedure.

However, in the art described in the Patent Document 1, when the input state of the item which already input has not been maintained, it is impossible to inform the user of this. That is, in the Patent Document 1 relating to the consumer transaction facility, operations as to the respective input items are dependent from each other, and an operation of inputting a current input item with the input state of the item which was input in the past maintained is not required. Thus, there was no need of a determination whether or not an input state as to the item which has already been input has not been continued.

SUMMARY OF THE INVENTION

Therefore, it is a primary object of the present invention to provide a novel storage medium storing a program and a novel information processing apparatus.

Another object of the present invention is to provide a storage medium storing a program and an information processing apparatus which are able to easily inform whether or not a previous operation item performed during a series of operating procedures has not been maintained.

The present invention employs following features in order to solve the above-described problems. It should be noted that reference numerals inside the parentheses and supplements show one example of a corresponding relationship with the embodiments described later for easy understanding of the present invention, and do not limit the present invention.

The first invention is a storage medium storing a program to be executed in a computer of an information processing apparatus having an input means and a display means, and causes a user to perform an operation according to a series of operating procedures by the input means. This program causes the computer to execute an operation item displaying step for displaying a plurality of operation items making up of the series of operating procedures on the display means in a first manner, and displaying at least a current operation item out of the plurality of operation items on the display means in a second manner different from the first manner, a first determining step for determining whether or not the current operation item is executed on the basis of input data from the input means, a first display changing step for changing a display of a next operation item to the second manner when it is determined that the current operation item is executed by the first determining step, a second determining step for determining whether or not a state attained by execution of a previous operation item has not been maintained on the basis of the input data from the input means, and a second display changing step for changing a display of the current operation item to the first manner when it is determined that the state attained by the previous operation item has not been maintained by the second determining step.

In the first invention, the program is executed in a computer (34, 44, 46) of an information processing apparatus (10) for allowing an operation according to a series of operating procedures by an input means (24), and causes the computer to execute the following steps. In an operation item displaying step (S7, S9, S101), a plurality of operation items making up of the series of operating procedures are displayed on a display means (12, 14) in a first manner, and at least a current operation item is displayed in a second manner different from the first manner. Thus, since the current operation item can be emphasized, the user can easily recognize which is a current operation item. In a first determining step (S33-S37, S201, S301), it is determined whether or not a current operation item is executed on the basis of the input data. In a first display changing step (S39, S9, S101), when it is determined that the current operation item is executed, a display of a next operation item is changed to the second manner. Since the next operation item is changed from the first manner to the second manner, the user can easily confirm which operation item is to be executed next. In a second determining step (S41-S47, S205, S303), it is determined whether or not a state attained by execution of the previous operation item has not been maintained on the basis of the input data. In a second display changing step (S49, S9, S101, S307), when it is determined that a state attained by execution of the previous operation item has not been maintained, the display of the current operation item is changed to the first manner. This makes it possible for the user to easily confirm that an operation item which he or she tries to execute has not been the operation item to be executed.

According to the first invention, when the state of the previous operation item has not been maintained while the user performs an operation for the current operation item displayed in the second manner out of the series of operating procedures, the current operation item is changed from the second manner to the first manner, so that it is possible to inform the user of the previous operation item. Accordingly, the user can easily confirm that an operation item to be executed is changed. Thus, it is possible to easily inform the user that the previous operation item has not been maintained, and that the previous operation item has to be started from the beginning.

A second invention is a storage medium storing a program according to the first invention, and the first display changing step changes a display of a next operation item to the second manner and changes the display of the current operation item to the first manner when it is determined that the current operation item is executed by the first determining step, and the second display changing step changes the display of the current operation item to the first manner and changes the display of the previous operation item to the second manner when it is determined that a state attained by execution of the previous operation item has not been maintained by the second determining step.

In the second invention, the second manner display can currently be moved (forward or backward) in accordance with the shift of the operation item to be executed in the series of operating procedures, and only the current operation item can be displayed in the second manner.

A third invention is a storage medium storing a program according to the first invention, and the first display changing step displays the operation items from a first operation item to a next operation item in the second manner when it is determined that the current operation item is executed by the first determining step.

In the third invention, when it is determined that the current operation item is executed, in a first display changing step (S101), the operation items from a first operation item to a next operation item are displayed in the second manner. Thus, every time that an operation item is executed, a second manner display can be increased. Furthermore, by the second manner display sandwiched between the first manner display and the second manner display, it is possible to easily inform the user of the operation item to be currently executed.

A fourth invention is a storage medium storing a program according to the first invention, and the first determining step makes a determination on the basis of the input data from the input means and a first condition stored in advance for advancing the current operation item to the next operation item, and the second determining step makes a determination on the basis of the input data from the input means and a second condition stored in advance for returning the current operation item to the previous operation item.

In the fourth invention, in the first determining step, whether or not the current operation item is executed is determined on the basis the of the first condition, and in the second determining step, whether or not the state of the previous operation item has not been maintained on the basis of the second condition. Since separate conditions for advancing and backing the operating procedure are stored in advance, it is possible to easily perform an operation determination.

A fifth invention is a storage medium storing a program according to the first invention, and the input means is a pointing device for instructing an arbitrary position on a screen to be displayed on the display means, and inputting coordinate data of the instructed position, the first determining step determines whether or not an operation kind is a predetermined state on the basis of the coordinate data, determines whether or not an operation area is a predetermined area, and determines the current operation item is executed in a case that both of the operation kind and the operation area are satisfied, and the second determining step determines whether or not the operation kind is the predetermined state on the basis of the coordinate data, determines whether or not the operation area is the predetermined area, and determines that a state attained by execution of the previous operation item has not been maintained in a case that both of the operation kind and the operation area are satisfied.

The fifth invention can be applied when a series of operating procedures is executed by the user by utilizing a pointing device such as a touch panel. In the first determining step, determinations of the operation kind and the operation area by means of the pointing device are performed on the basis of the input coordinate data, and in a case that both of the operation kind and the operation area are satisfied, it is determined that the current operation item is executed. Furthermore, in the second determining step, determinations of the operation kind and the operation area by means of the pointing device are performed on the basis of the input coordinate data, and in a case that both of the operation kind and the operation area are satisfied, it is determined that the state of the previous operation item has not been maintained. Since whether or not the coordinate data input by the user indicates the predetermined operation kind and indicates the predetermined operation area are determined, it is possible to easily and appropriately execute an operation determination.

A sixth invention is an information processing apparatus having an input means and a display means, and causing a user to perform an operation according to a series of operating procedures by the input means. The information processing apparatus comprises an operation item displaying means for displaying a plurality of operation items making up of the series of operating procedures on the display means in a first manner, and displaying at least a current operation item out of the plurality of operation items on the display means in a second manner different from the first manner, a first determining means for determining whether or not the current operation item is executed on the basis of input data from the input means, a first display changing means for changing a display of a next operation item to the second manner when it is determined that the current operation item is executed by the first determining means, a second determining means for determining whether or not a state attained by execution of a previous operation item has not been maintained on the basis of the input data from the input means, and a second display changing means for changing a display of the current operation item to the first manner when it is determined that the state attained by the previous operation item has not been maintained by the second determining means.

In the sixth invention, similar to the above-described first invention, when the state of the previous operation item has not been maintained, the current operation item is changed from the second manner to the first manner, and therefore, it is possible to easily inform the user that the previous operation item has not been maintained.

According to the present invention, a plurality of operation items making up of a series of operating procedures are displayed in the first manner and a current operation item is displayed in the second manner. When the state of the previous operation item has not been maintained during execution of the current operation item, the display of the current operation item is changed from the second manner to the first manner. This makes it possible to inform the user that the previous operation item has not been maintained and has to be started from the beginning.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 8 is an illustrative view showing one example of operation definition data;

FIG. 9 is an illustrative view showing one example of condition data;

DETAILED DESCRIPTION OF THE PREFERRED EMBODIMENTS

Figure 1:
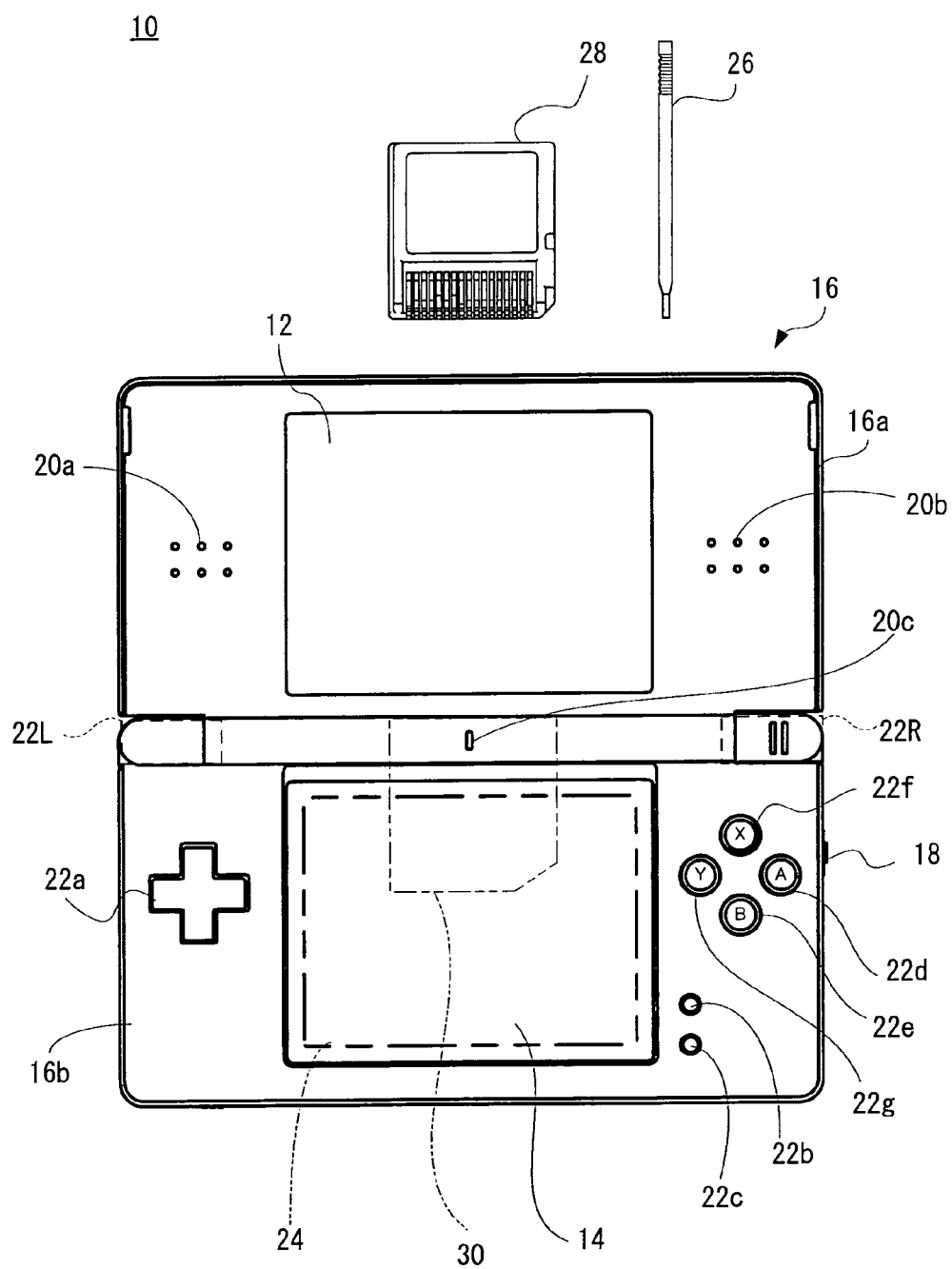
FIG. 1 is an illustrative view showing one embodiment of a game apparatus (information processing apparatus) of the present invention.

Referring to FIG. 1, an information processing apparatus 10 of an embodiment of the present invention is realized in a form of a hand-held type game apparatus as one example. It should be noted that the form of the information processing apparatus 10 is arbitrary, and the information processing apparatus 10 may be realized in other forms, such as a console type game apparatus, a personal computer, a hand-held information terminal, a cellular phone, etc.

An information processing apparatus, that is, the game apparatus 10 includes a first liquid crystal display (LCD) 12 and a second LCD 14. The LCD 12 and the LCD 14 are set on a housing 16 so as to be arranged in predetermined positions. In this embodiment, the housing 16 comprises an upper housing 16a and a lower housing 16b, and the LCD 12 is provided on the upper housing 16a while the LCD 14 is provided on the lower housing 16b. Accordingly, the LCD 12 and the LCD 14 are closely arranged so as to be longitudinally (vertically) parallel with each other.

In addition, although an LCD is utilized as a display in this embodiment, an EL (Electronic Luminescence) display, a plasmatic display, etc. may be used in place of the LCD.

As can be understood from FIG. 1, the upper housing 16a has a plane shape little larger than a plane shape of the LCD 12, and has an opening formed so as to expose a display surface of the LCD 12 from one main surface thereof. On the other hand, the lower housing 16b has a shape and a size approximately the same as the upper housing 16a, and has an opening formed so as to expose a display surface of the LCD 14 at an approximately center of the horizontal direction. Also, a power switch 18 is provided at the right side surface of the lower housing 16b.

Furthermore, the upper housing 16a is provided with sound release holes 20a and 20b for speakers 36a and 36b (see FIG. 2) on both sides of the LCD 12.

The upper housing 16a and the lower housing 16b are rotatably connected at a lower side (lower edge) of the upper housing 16a and a part of an upper side (upper edge) of the lower housing 16b. Accordingly, in a case of not playing a game, for example, if the upper housing 16a is rotatably folded such that the display surface of the LCD 12 and the display surface of the LCD 14 are face to face with each other, it is possible to prevent the display surface of the LCD 12 and the display surface of the LCD 14 from being damaged such as a flaw, etc. It should be noted that the upper housing 16a and the lower housing 16b are not necessarily rotatably connected with each other, and may alternatively be provided integrally (fixedly) to form the housing 16.

Then, a microphone hole 20c for a microphone (not illustrated) is formed at the center of the connected portion between the upper housing 16a and the lower housing 16b. This makes it possible to perform game processing on the basis of a sound signal by a sound, a voice or a breath taken from the microphone.

Furthermore, the lower housing 16b is provided with an operating switch 22 (22a, 22b, 22c, 22d, 22e, 22L and 22R).

The operating switch 22 includes a direction instructing switch (cross switch) 22a, a start switch 22b, a select switch 22c, an action switch (A button) 22d, an action switch (B button) 22e, an action switch (X button) 22f, an action switch (Y button) 22g, an action switch (L button) 22L, and an action switch (R button) 22R. The switch 22a is arranged at the left of the LCD 14 on one surface of the lower housing 16b. Other switches 22b-22g are arranged at the right of the LCD 14 on the one surface of the lower housing 16b. In addition, the operating switches 22L and 22R are arranged at the right and left corners on the upper side surface of the lower housing 16b. It should be noted that action switches 22L and 22R are provided on a back surface of the lower housing 16b, and shown by dotted line because they are hidden under the connected portion in a front view as shown in FIG. 1.

The direction instructing switch 22a functions as a digital joystick, and is utilized for instructing a traveling direction (moving direction) of a player object (or player character) to be operated by a user or a player and instructing a traveling direction of a cursor, and so forth by operating any one of four depression portions. Also, a specific role can be assigned to each of the four depression portions, and by operating any one of the four depression portions, it is possible to instruct (designate) the assigned role.

The start switch 22b is formed by a push button, and is utilized for starting (restarting), temporarily stopping (pausing) a game, and so forth. The select switch 22c is formed by the push button, and utilized for a game mode selection, etc.

The action switch 22d, that is, the A button is formed by the push button, and allows the player object to perform an arbitrary action, except for instructing the direction, such as hitting (punching), throwing, holding (obtaining), riding, jumping, etc. For example, in an action game, it is possible to apply an instruction of jumping, punching, moving arms, etc. In a role-playing game (RPG) and a simulation RPG, it is possible to apply an instruction of obtaining an item, selecting and determining arms or command, etc. The action switch 22e, that is, the B button is formed by the push button, and is utilized for changing a game mode selected by the select switch 22c, canceling an action determined by the A button 22d, and so forth.

The action switch 22f, that is, the X button and the action switch 22g, that is, the Y button are formed by the push buttons, and are utilized for a subsidiary operation when the game cannot be advanced only with the A button 22d and the B button 22e. It should be noted that the X button 22f and the Y button 22g can be used for the similar operation to the A button 22d and B button 22e. Of course, the X button 22f and the Y button 22g are not necessarily utilized in the game play.

The action switch (left depression button) 22L and the action switch (right depression button) 22R are formed by the push buttons, and the left depression button (L button) 22L and the right depression button (R button) 22R can perform the same operation as the A button 22d and the B button 22e, and also function as a subsidiary of the A button 22d and the B button 22e. In addition, the L button 22L and the R button 22R can change the roles assigned to the direction switch 22a, the A button 22d, the B button 22e, the X button 22f, and the Y button 22g to other roles.

Also, on a top surface of the LCD 14, a touch panel 24 is provided. As the touch panel 24, any kinds of a resistance film system, an optical system (infrared rays system) and an electrostatic capacitive coupling system, for example, can be utilized. In response to an operation (touch input) by depressing, stroking, touching, and so forth with a stick 26, a pen (stylus pen), or a finger (hereinafter, referred to as "stick 26, etc.") on a top surface of the touch panel 24, the touch panel 24 detects coordinates of an operated position by the stick 26, etc. to output coordinates data corresponding to the detected coordinates.

It should be noted that in this embodiment, a resolution of the display surface of the LCD 14 (the same is true for the LCD 12) is 256 dots×192 dots. A detection accuracy of the touch panel 24 is also rendered 256 dots×192 dots in correspondence to the resolution of the display surface. However, the detection accuracy of the touch panel 24 may be lower than the resolution of the display surface, or higher than it.

Different game screens may be displayed on the LCD 12 and the LCD 14. For example, in a racing game, a screen viewed from a driving seat is displayed on the one LCD, and a screen of entire race (course) may be displayed on the other LCD. Furthermore, in the RPG, a map, characters such as, a player object, etc. are displayed on the one LCD, and items belonging to the player object may be displayed on the other LCD. Additionally, a game screen including a player object and a non-player object, etc. may be displayed on the one LCD, and a game screen including information relating to the player object and the non-player object or an operation screen for operating the player object can be displayed on the other LCD. Furthermore, by utilizing the two LCD 12 and LCD 14 as one screen, it is possible to display a large monster (enemy object) to be defeated by the player object.

Accordingly, the player is able to point (operate) an image such as a player object, an enemy object, an item object, an operating object, etc. to be displayed on the screen of the LCD 14 and select (input) commands by operating the touch panel 24 with the use of the stick 26, etc. Also, it is possible to change the direction of a virtual camera (viewpoint) (direction of the line of sight) provided in the virtual game space (three-dimensional game space), and instruct a scrolling (gradual moving display) direction of the game screen (map).

Additionally, depending on the kind of the game, other input instructions can be made with the use of the touch panel 24. For example, it is possible to input by hand texts, numbers, symbols, etc. on the LCD 14 of the touch panel 24.

Thus, the game apparatus 10 has the LCD 12 and the LCD 14 as a display portion of two screens, and by providing the touch panel 24 on an upper surface of any one of them (LCD 14 in this embodiment), the game apparatus 10 has the two screens (12, 14) and the operating portions (22, 24) of two systems.

Although the first LCD 12 and the second LCD 14 are vertically arranged, the arrangement of the two LCDs may be changed as necessary. In another embodiment, the first LCD 12 and the second LCD 14 may horizontally be arranged.

Furthermore, in this embodiment, two LCDs are provided, but the number of LCDS as a display means can be changed as necessary. In another embodiment, a vertically-long LCD is provided, and by vertically dividing the display areas into two, two game screens may be displayed on the respective display areas, or a horizontally-long LCD is provided, and by horizontally dividing the display area side by side, two game screens may be displayed on the respective display areas.

In addition, the stick 26 can be housed in the housing portion (not shown) provided on the lower housing 16b, for example, and taken out as necessary. It should be noted that if the stick 26 is not provided, the housing portion also need not to be provided.

Also, the game apparatus 10 includes a memory card (or cartridge) 28. The memory card 28 is detachable, and inserted into a loading slot 30 (shown by dotted lines in FIG. 1) provided on an upper edge surface of the lower housing 16b. Although omitted in FIG. 1, a connector 32 (see FIG. 2) is provided at a depth portion of the loading slot 30 for connecting a connector provided at an end portion of the memory card 28 in the loading direction, and when the memory card 28 is loaded into the loading slot 30, the connectors are connected with each other, and therefore, the memory card 28 is accessible by a CPU core 34 (see FIG. 2) of the game apparatus 10.

Furthermore although omitted in FIG. 1, a battery accommodating box is provided on a rear surface of the lower housing 16b, a volume switch, an earphone jack, etc. are provided on the lower edge surface (bottom surface) of the lower housing 16b, and an external expansion connector is provided on the upper edge surface (top surface), for example.

Figure 2:
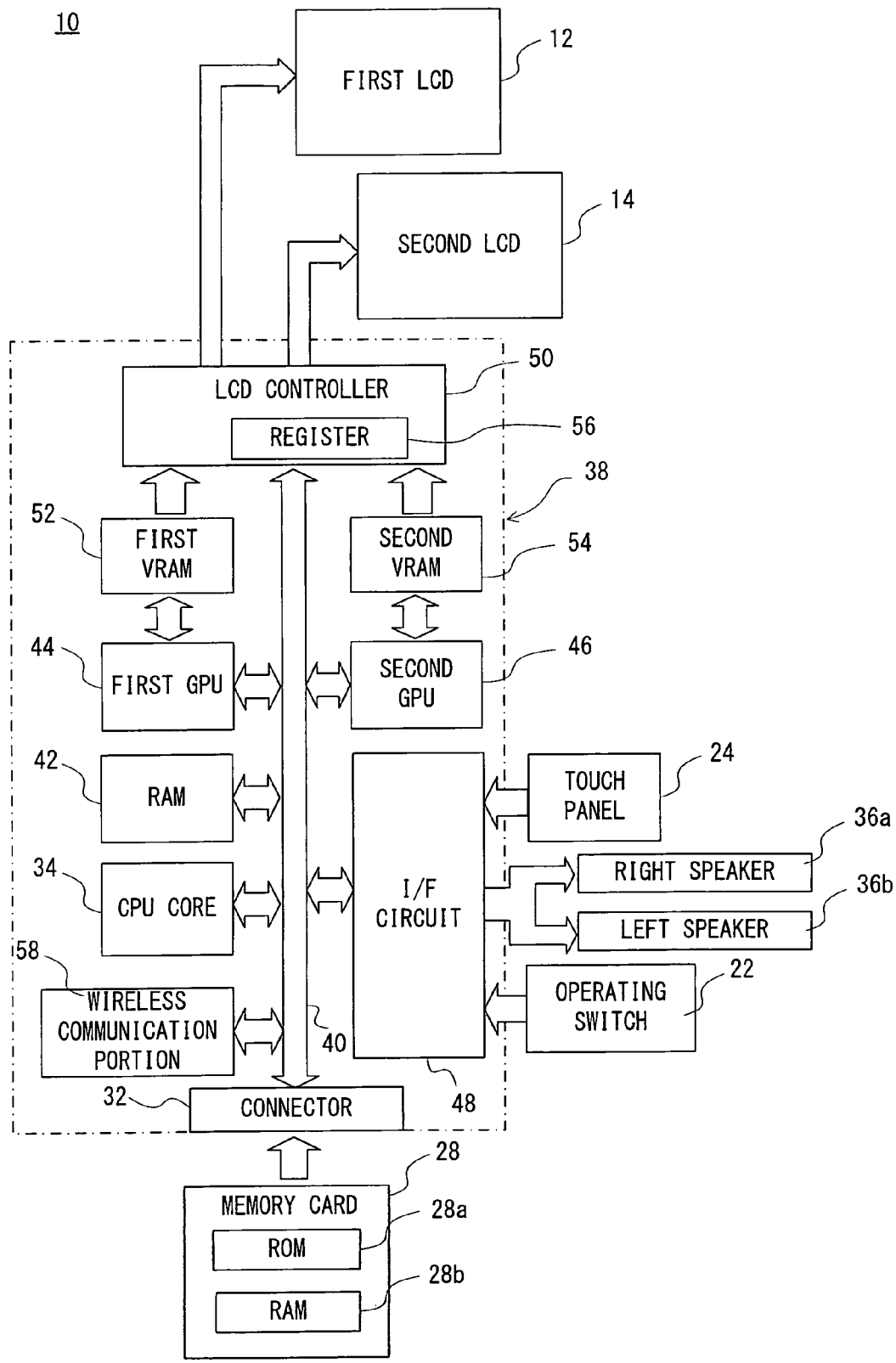
FIG. 2 is a block diagram showing one example of an electric configuration of the game apparatus shown in FIG. 1.

FIG. 2 is a block diagram showing an electrical configuration of the game apparatus 10. Referring to FIG. 2, the game apparatus 10 includes an electronic circuit board 38, and on the electronic circuit board 38, a circuit component such as a CPU core 34, etc. is mounted. The CPU core 34 is connected to the above-described connectors 32 via a bus 40, and is connected with a RAM 42, a first graphics processing unit (GPU) 44, a second GPU 46, an input-output interface circuit (hereinafter, referred to as "I/F circuit") 48, an LCD controller 50, and a wireless communication portion 58.

The connector 32 is detachably connected with the memory card 28 as described above. The memory card 28 includes a ROM 28a and a RAM 28b, and although illustration is omitted, the ROM 28a and the RAM 28b are connected with each other via a bus and also connected with a connector (not shown) to be connected with the connector 32. Accordingly, the CPU core 34 gains access to the ROM 28a and the RAM 28b as described above.

The ROM 28a stores in advance a game program for a game to be executed by the game apparatus 10, image data (text and object image, background image, item image, icon (button) image, message image, etc.), data of the sound (music) necessary for the game (sound data), etc. The RAM (backup RAM) 28b stores (saves) proceeding data of the game, result data of the game, etc. As a save memory, a flash memory or the like may be utilized.

The RAM 42 is utilized as a buffer memory or a working memory. That is, the CPU core 34 loads the game program, the image data, the sound data, etc. stored in the ROM 28a of the memory card 28 into the RAM 42, and executes processing according to the loaded game program. Furthermore, the CPU core 34 executes a game process while storing data (game data, flag data, etc.) generated or obtained in correspondence with a progress of the game in the RAM 42.

Additionally, the game program, the image data, the sound data, etc. are read from the ROM 28*a* entirely at a time, or partially and sequentially so as to be stored into the RAM 42.

It should be noted that in the game apparatus 10, other applications except for the game may be executed, and in this case, a program in relation to an application and the necessary data such as image data may be stored in the ROM 28*a* of the memory card 28. Furthermore, sound (music) data may be stored as necessary.

Each of the GPU 44 and the GPU 46 forms a part of a rendering means, is constructed by, for example, a single chip ASIC, and receives a graphics command (drawing instruction) from the CPU core 34 to generate image data according to the graphics command. It should be noted that the CPU core 34 applies an image generation program (included in the game program) required to generate the image data to both of the CPU 44 and GPU 46 in addition to the graphics command.

Furthermore, the GPU 44 is connected with a first video RAM (hereinafter referred to as "VRAM") 52, and the GPU 46 is connected with a second VRAM 54. The GPU 44 and the GPU 46 respectively access the first VRAM 52 and the second VRAM 54 to obtain necessary data (image data: polygon data, texture data, etc.) to execute a graphics command.

In addition, the CPU core 34 writes image data necessary for drawing to the first VRAM 52 and the second VRAM 54 via the GPU 44 and the GPU 46. The GPU 44 accesses the VRAM 52 to produce image data necessary for drawing and stores the same in a rendering buffer of the VRAM 52. The GPU 46 accesses the VRAM 54 to produce image data for drawing and store the same in the rendering buffer of the VRAM 54. As a rendering buffer, a frame buffer, a line buffer, etc. may be adopted.

The VRAM 52 and the VRAM 54 are connected to the LCD controller 50. The LCD controller 50 includes a register 56, and the register 56 consists of, for example, one bit, and stores a value of "0" or "1" (data value) according to an instruction of the CPU core 34. The LCD controller 50 outputs the image data produced by the GPU 44 to the LCD 12, and outputs the image data produced by the GPU 46 to the LCD 14 in a case that the data value of the register 56 is "0". Additionally, the LCD controller 50 outputs the image data produced by the GPU 44 to the LCD 14, and outputs the image data produced by the GPU 46 to the LCD 12 in a case that the data value of the register 56 is "1".

Furthermore, the LCD controller 50 can directly read the image data from the VRAM 52 and the VRAM 54, or read the image data from the VRAM 52 and the VRAM 54 via the GPU 44 and the GPU 46.

In addition, the VRAM 52 and the VRAM 54 are may be provided in the RAM 42, or a rendering buffer and a Z buffer therefor may be provided in the RAM 42.

The I/F circuit 48 is connected with the operating switch 22, the touch panel 24 and the speakers 36*a*, 36*b*. Here, the operating switch 22 is the above-described switches 22*a*, 22*b*, 22*c*, 22*d*, 22*e*, 22*f*, 22*g*, 22L and 22R, and in response to an operation of the operating switch 22, a corresponding operation signal (operation data) is input to the CPU core 34 via the I/F circuit 48. Furthermore, coordinates data output from the touch panel 24 is input to the CPU core 34 via the I/F circuit 48. In addition, the CPU core 34 reads from the RAM 42 the sound data necessary for the game such as a game music (BGM), a sound effect or voices of a game character (onomatopoeic sound), etc., and outputs it from the speakers 36*a*, 36*b* via the I/F circuit 48.

The wireless communication portion 58 is a communication means for transmitting and receiving data with another game apparatus 10 or communications equipment by radio. Here, the weak radio wave transmitted and received by the game apparatus 10 is set in intensity to such a degree as not to be restricted by the Radio Law. When the CPU core 34 applies data such as game data, a command, etc. to the wireless communication portion 58, the wireless communication portion 58 modulates communication data to be transmitted to the opponent into a wireless signal and transmits it from an antenna. Furthermore, the wireless communication portion 58 receives a wireless signal from the opponent by the antenna to demodulate it to data, and applies the data to the CPU core 34. Via the wireless communication portion 58, the game apparatus 10 receives and transmits data with another game apparatus 10 to execute a communication game. Additionally, the game apparatus 10 can connect to a network via the wireless communication portion 58 to thereby download a program and data from a server on the network and communicate with another game apparatus 10 via the network.

In the game apparatus 10, a plurality of operation items making up of a series of operating procedures to be executed by a user are displayed. At least a current operation item, that is, an operation item to be currently executed out of the plurality of operation items is highlighted. The highlight is changed to another operation item by an operation of the user. More specifically, when a current operation item is executed by the user, a next operation item is highlighted. Furthermore, in an operating procedure, a current operation item has to be performed with an input state of a previous operation item maintained. When the state of the previous operation item is not satisfied by an operation of the user, the previous operation item is highlighted. This makes it possible to easily inform the user that the previous operation item performed in a series of operating procedures has not been maintained, and the previous operation item has to be started from the beginning.

Figure 3:
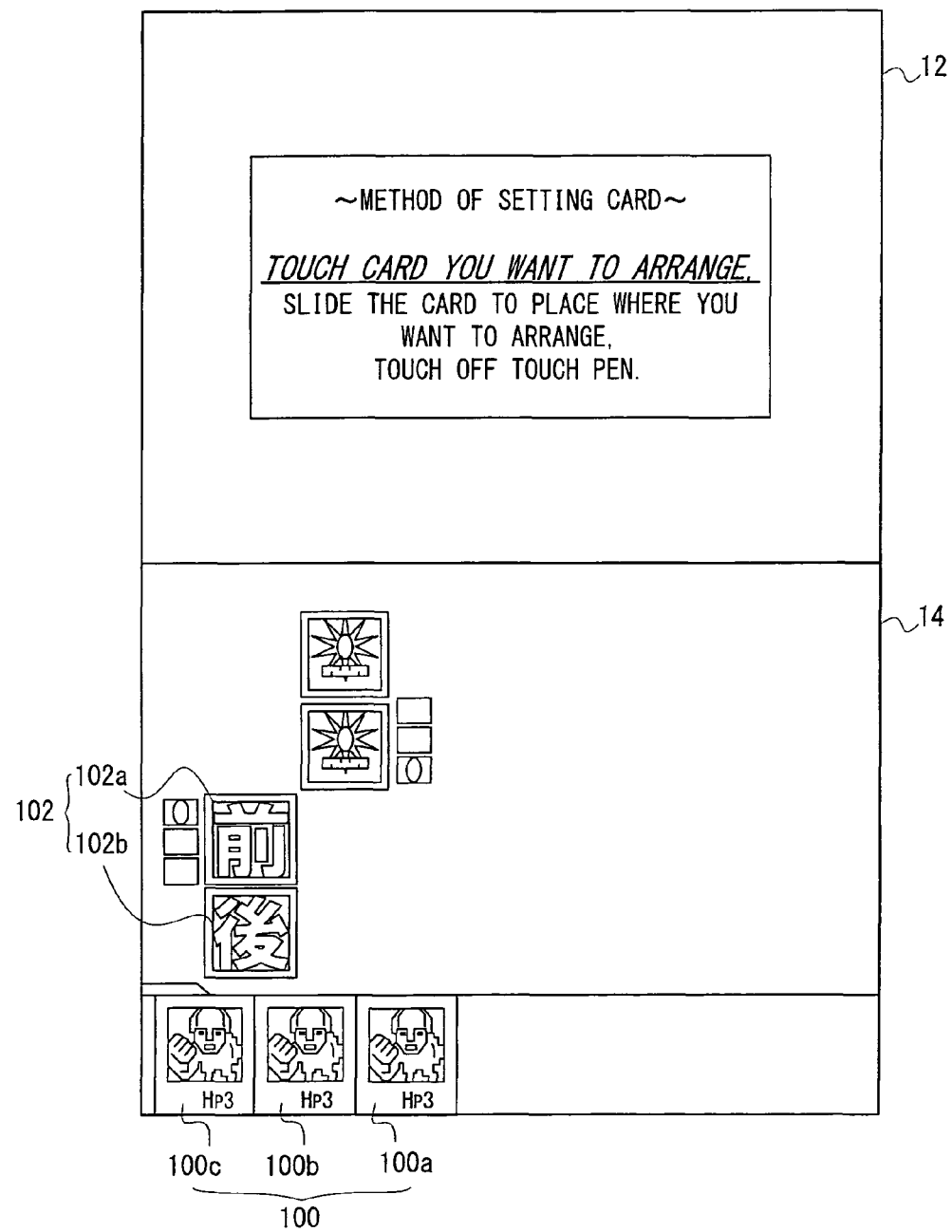
FIG. 3 is an illustrative view showing one example of an initial screen.

FIG. 3 shows one example of an initial screen before an operation by the user. On the upper screen displayed on the LCD 12, a series of operating procedures is shown, and on the lower screen displayed on the LCD 14, an operation screen by the user is shown. More specifically, the screen is a screen to be displayed when the user is caused to perform an operation of arranging a card in a card game.

A message showing a method of setting a card is displayed in letters on the LCD 12. That is, a message showing that "touch a card you want to arrange, /slide the card to a place where you want to arrange/touch off the touch pen." is displayed under a title of a "method of setting a card". The method, that is, each of the series of operating procedures has three operation items to be successively performed. That is, a first operation item is to touch a card you want to arrange, a second operation item is to slide the touched position to a position where you want to arrange, and a third operation item is to touch off the touch pen (stick 26, etc.) from the slided position.

Then, an operation item to currently be executed out of the operating procedures is highlighted, and the other operation items are normal-displayed. Since FIG. 3 is an initial screen of the operation, a part of the message showing that "touch a card you want to arrange" representing the first operation item is highlighted. The display manner of the highlight is different from that of the normal display. In this embodiment, as one example, an operation item to be highlighted is underlined, is utilized with an oblique face or large letters. The manner of the normal display is called a first manner, and the manner of the highlight is called a second manner. Here, the second manner is only necessary to be differentiated from the first manner, but is more desirable if it is conspicuous and distinguishable. The second manner in this embodiment is differentiated from the first manner in font (design and style) and letter size, or is decorated by underlining the first manner. Furthermore, in another embodiment, the color of the letters are different between the first manner and the second manner, such as use of a green letter in the first manner and use of a red letter in the second manner, for example.

On the other hand, on the operation screen of the LCD 14, a plurality of cards 100 to be selected by the user and a plurality of arrangement positions 102 are displayed. In this embodiment, three cards 100a, 100b and 100c are horizontally arranged at a predetermined position of the lower end of the screen, and two arrangement position 102a and 102b are vertically arranged at a predetermined position of the left end of the screen.

On the operation screen, the user can selects a desired card 100 from the three cards 100, and arrange the selected card 100 at a desired arrangement position 102 out of the two arrangement positions 102. Accordingly, a series of operating procedures is displayed as a method of setting a card as described above on the LCD 12. Then, the current operation item is to touch a card you want to arrange, as highlighted on the LCD 12. Thus, the user touches the desired card 100, that is, instructs a display area of the card 100 with the stick 26, etc.

Figure 4:
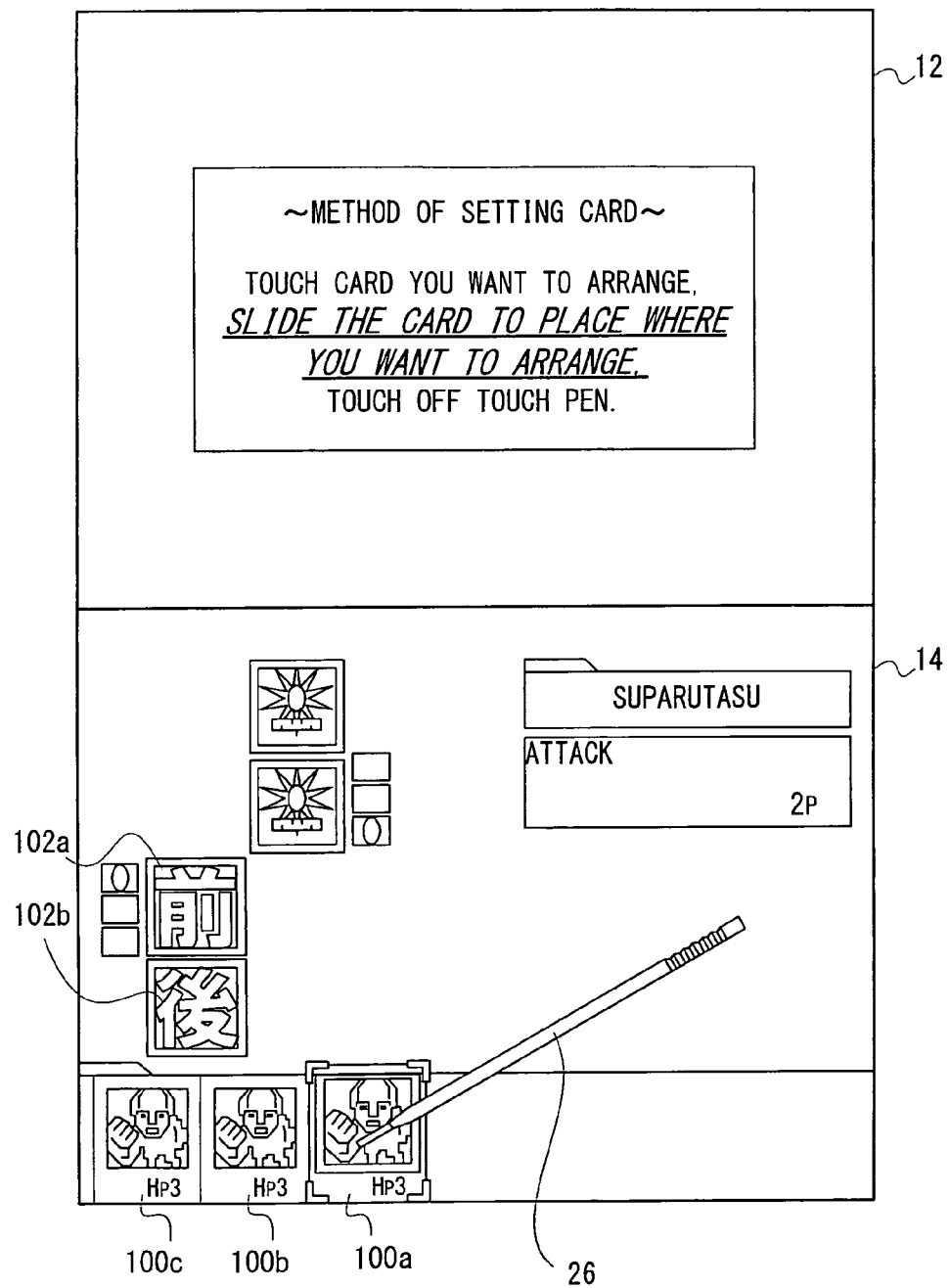
FIG. 4 is an illustrative view showing one example of the screen after a first operation item is executed.

In a case that the card 100 is touched by the user, the current operation item shifts to a next operation item to thereby display a screen shown in FIG. 4. More specifically, on the LCD 12, a part of the message showing that "slide the card to a place where you want to arrange" representing the second operation item is highlighted. Here, the first operation item which has become a previous operation item is normal-displayed. This makes it possible to inform the user that the current operation item shifts to the second operation item.

On the other hand, on the LCD 14, the selected card 100 (100a) is displayed by utilizing an image indicating a selected state. More specifically, the selected card 100a is slightly enlarged, and the card 100a is further applied with a cursor image (frame border at four corners). Furthermore, on the right side of the screen, an explanation such as a name, ability, etc. of the selected card 100a is displayed so as to be confirmed by the user.

Figure 5:
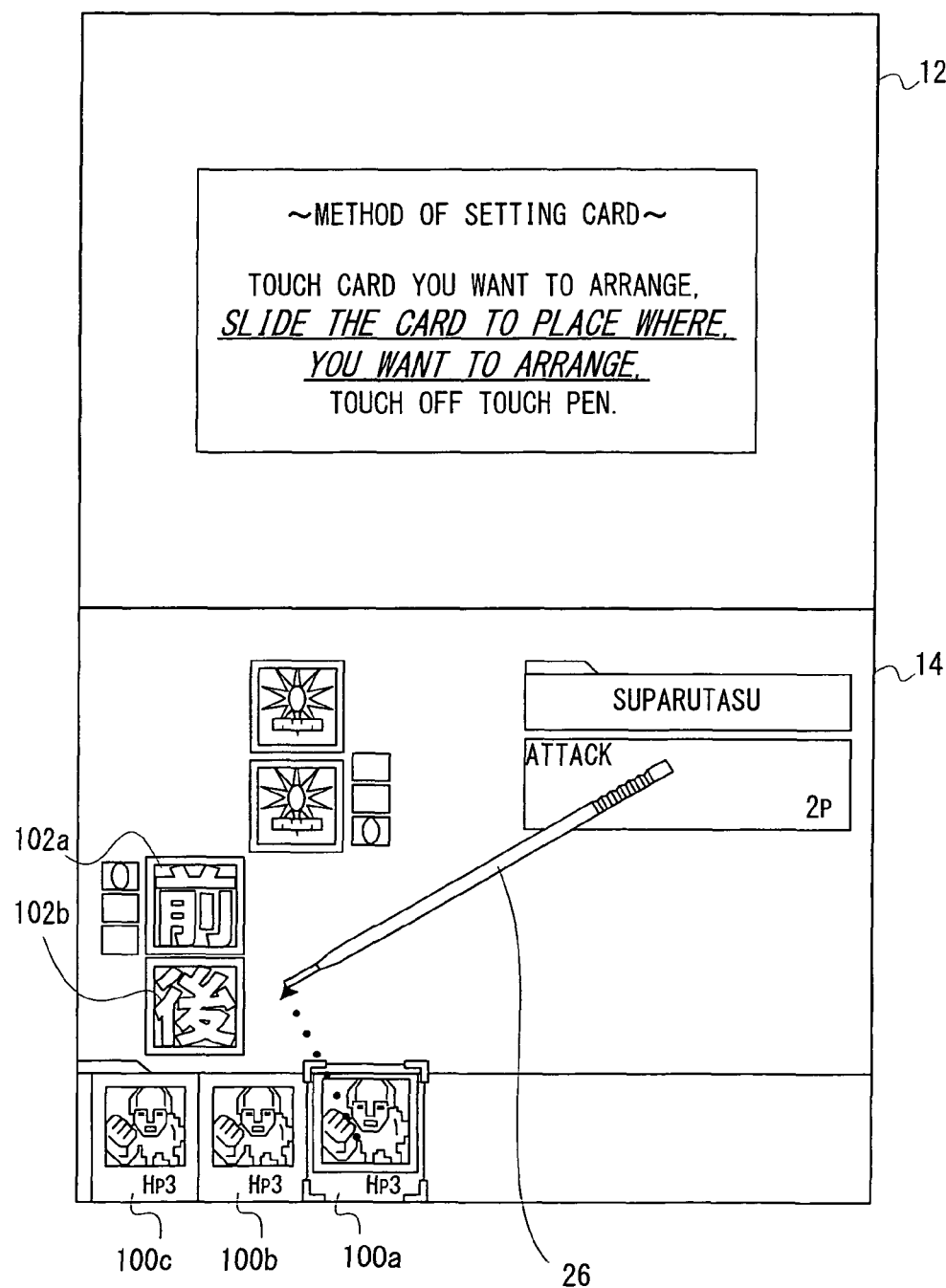
FIG. 5 is an illustrative view showing one example of the screen when a second operation item is executed.

The current operation item is to slide the touched position to a place where you want to arrange, as highlighted on the LCD 12. Accordingly, the user moves the touched position with the stick 26, etc. to a desired arrangement position 102. The screen at a time of this operation is shown in FIG. 5. In a case that the touched position by the stick 26, etc. is not moved into an area of the arrangement position 102, since the second operation item has not been attained yet, the second operation item remains to be highlighted on the LCD 12 as shown in FIG. 5.

Figure 6:
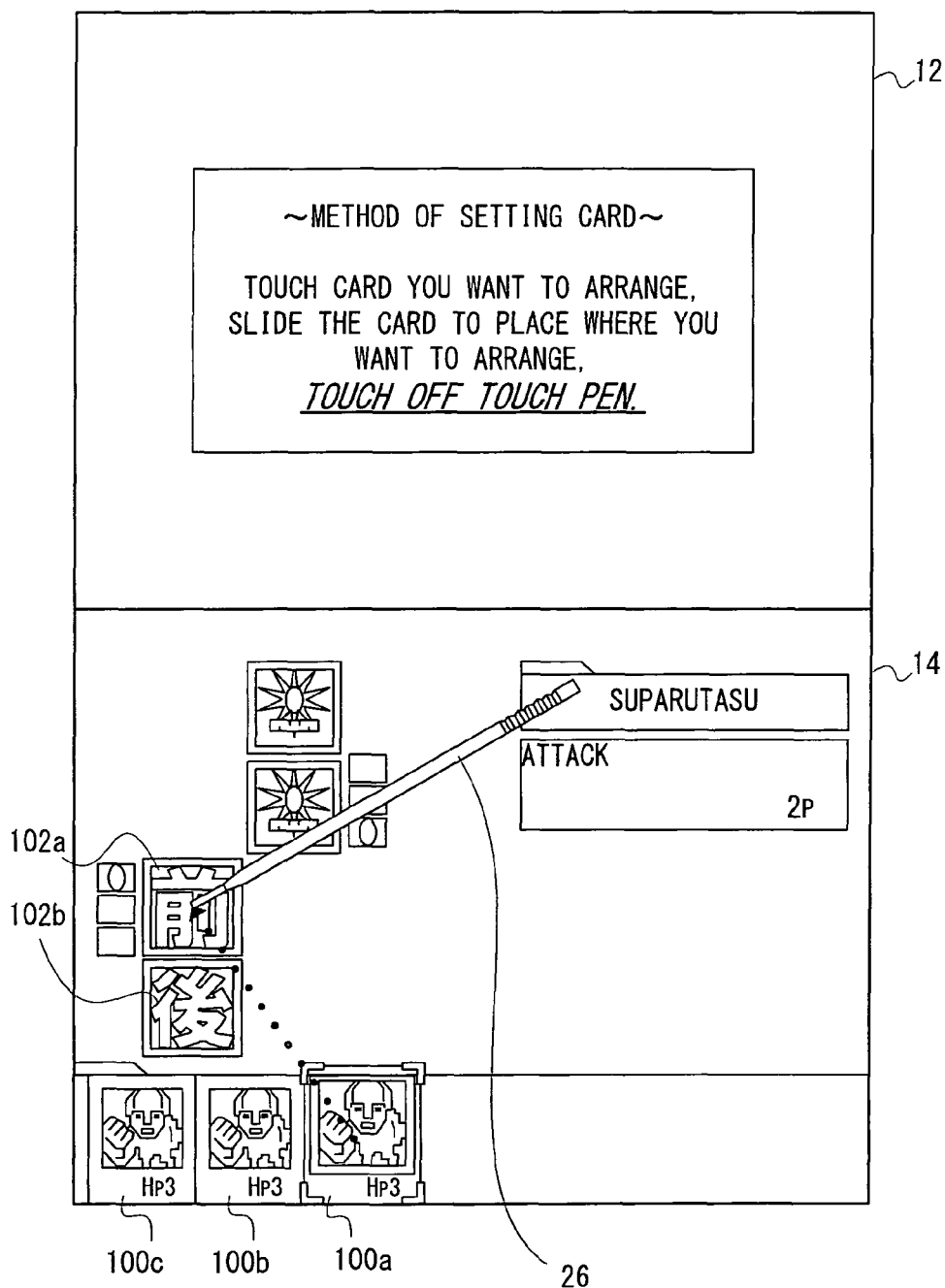
FIG. 6 is an illustrative view showing one example of the screen after the second operation item is executed.

In a case that the touched position by the stick 26, etc. moves inside the arrangement position 102, the second operation item is attained. Accordingly, the current operation item shifts to a next operation item to show a screen shown in FIG. 6. More specifically, the touched position has moved to the arrangement position 102a. On the LCD 12, a part of the message showing that "touch off the touch pen" representing the third operation item is highlighted. Here, the second operation item which has become a previous operation item is normal-displayed. This makes it possible to inform the user that the current operation item shifts to the third operation item.

Accordingly, when the user releases the stick 26, etc. from the touch panel 24 within the arrangement position 102 (102a), the arrangement position of the selected card 100a is decided. Although illustration is omitted, on the LCD 14, an image in which the card 100a is arranged at the arrangement position 102a is displayed.

Furthermore, in this embodiment, in a case that a state attained by execution of the previous operation item has not been maintained during execution of the current operation item, the operation item to be executed is returned and the highlight is also returned.

More specifically, in a case that the current operation item is the second operation item (see FIG. 4 and FIG. 5), when a touched position by the stick 26, etc. is released from the touch panel 24, the first operation item of touching the card 100 has not been satisfied. That is, the selection of the card 100 by the execution of the first operation item has not been maintained. Thus, the current operation item is returned from the second operation item to the first operation item, and the first operation item is highlighted on the LCD 12 as shown in FIG. 3. This makes it possible to easily inform the user that the first operation item has not been maintained, so that the first operation item has to be started from the beginning.

Furthermore, in a case that the current operation item is the third operation item (see FIG. 6) also, when the state attained by the previous operation item has not been maintained, the operation item is returned. More specifically, when the arrangement position 102 is selected by execution of the second operation item, but the touched position by the stick 26, etc. moves outside the area of the arrangement position 102, the selection of the arrangement position 102 by the second operation item has not been maintained. Thus, the current operation item is returned from the third operation item to the second operation item to thereby display a screen in which the second operation item is highlighted on the LCD 12 as shown in FIG. 5. This makes it possible to easily inform the user that the second operation item has not been maintained, and the second operation item has to be started from the beginning.

Figure 7:
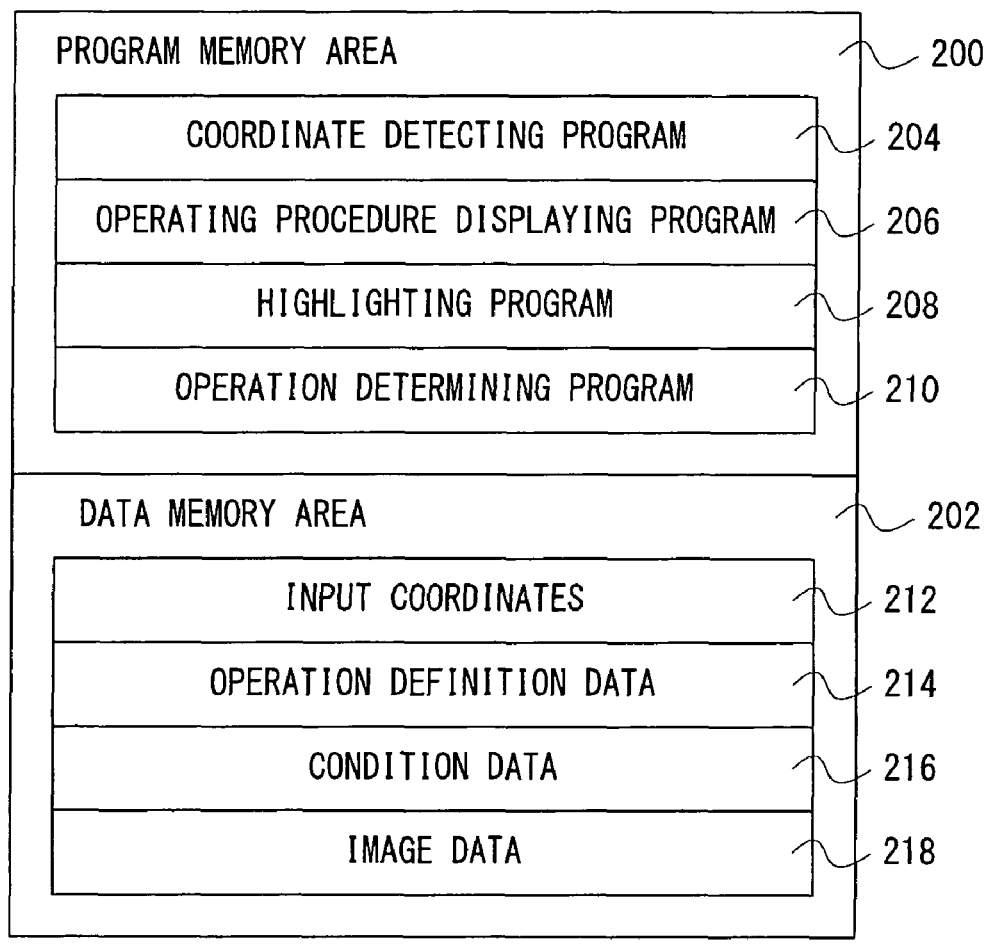
FIG. 7 is an illustrative view showing one example of a memory map.

FIG. 7 shows one example of a memory map of the RAM 42. The memory map includes a program memory area 200 and a data memory area 202. The program memory area 200 stores a program read from the ROM 28a, and the data memory area 202 stores data read from the ROM 28a or data generated or fetched by processing. Here, FIG. 7 shows a part of the memory map, and the program memory area 200 and data memory area 202 store other programs and data necessary for execution of the processing.

A memory area 204 of the program memory area 200 stores a coordinate detecting program. The program is a program for detecting coordinates from data input from the touch panel 24. Additionally, data including data indicating the presence or absence of an input by a user and coordinate data of an instructed position is input from the touch panel 24. The detection of the coordinates is performed at an interval of a constant time (1 frame=1/60 seconds, for example), and the detected coordinates are stored in an input coordinates memory area 212.

A memory area 206 stores an operating procedure displaying program. The program is a program for displaying a plurality of operation items making up of a series of operating procedures. The operating procedures are displayed on the basis of operation definition data stored in a memory area 214 and image data stored in a memory area 218. Operation items except for an operation item to be highlighted by a highlighting program stored in the memory area 208 are displayed by utilizing image data indicating a normal manner.

The memory area 208 stores a highlighting program. The program is a program for highlighting at least a current operation item out of the plurality of operation items. When an operation item is highlighted, image data indicating a highlight manner is used.

The memory area 210 stores an operation determining program. The program is a program for determining whether or not a current operation item is executed on the basis of the detected coordinate data, and determining whether or not a state attained by a previous operation item has not been maintained. In this embodiment, a condition for determining each operation item is stored in operation definition data stored in the memory area 214, and a content of each condition is stored in condition data stored in a memory area 216.

Furthermore, in the memory area 212 of the data memory area 202, input coordinates detected by the coordinate detecting program is stored. Here, for determination of an operation, histories of input coordinates by a predetermined number of frames are stored.

The memory area 214 stores operation definition data read from the ROM 28*a*. The operation definition data is data for defining a series of operating procedures. As shown in FIG. 8, data of each of the plurality of operating procedures is stored by being brought into correspondence with identification information (processing ID=P01, P02, . . . ). The data for an operating procedure of the above-described method of arranging a card is stored as processing ID of "P01". Additionally, another operating procedure, such as a use of a magic card, for example, is also stored. The operation definition data of each operating procedure is read as necessary as the game progresses.

The data of each operating procedure includes data defining a plurality of operation items constructing the operating procedure, and each operation item includes data such as a processing order, a determining condition and message, etc. The processing order shows an execution order of operation items in an operating procedure.

Furthermore, the determining condition includes a forward condition and a backward condition in this embodiment. The forward condition is a condition for determining whether or not a relevant operation item is executed, and in a case that the forward condition is satisfied, the operating procedure is advanced, that is, shifts to a next operation item. Alternatively the backward condition is a condition for determining whether or not to be backed to a previous operation item during execution of the operation item, and in a case that the backward condition is satisfied, the operating procedure is backed, that is, returned to a previous operation item. In a case that a state of the previous operation item executed in a series of operating-procedures has not been maintained, it is necessary to return to the previous operation item. Thus, the backward condition is also a condition for determining whether or not the state attained by execution of the previous operation item has not been maintained. It should be noted that since an operation item of a first processing order is a first operation item, it does not have the backward condition. Furthermore, each condition is defined by condition data described later, and as operation definition data, data ID of each condition is stored. As shown in this embodiment, in a case that separate conditions for determining whether to be advanced or backed are stored with respect to each of the series of operating procedure in advance, it is possible to easily determine the operation.

Furthermore, the message is data indicating a letter string of a content of an operation item, and each operation item is displayed on the basis of the message data and the image data. For example, the operating procedure having the processing ID of P01 is a method of setting a card shown in FIG. 3, a message of the operation item of the processing order 1 is to "touch a card you want to arrange", a message of the operation item of a processing order 2 is to "slide the card to a place where you want to arrange", and a message of the operation item of the processing order 3 is to "touch off the touch pen".

The memory area 216 shown in FIG. 7 stores condition data read from the ROM 28*a*. The condition data is data for defining a determining condition of each operation item. As shown in FIG. 9, each of the plurality of condition data are stored by being brought into correspondence with identification information (data ID=D01, D02, . . . ). In this embodiment, the determining condition includes a condition relating to an operation kind and an operation area.

The operation kind defines a kind of a touch operation with respect to the touch panel 24 or a kind of a change of a state of an input (operation) by utilizing the touch panel 24. Thus, it is determined whether or not an operation defined by the kind of the operation is performed, that is, whether or not the change of the input state defined by an operation is detected.

More specifically, the operation kind includes a touch-on, a touch-off, a sliding, etc. The touch-on is an operation changing from an absence of an input to a presence of an input with respect to the touch panel 24, that is, means a start of an input to the touch panel 24. The touch-off is an operation of changing from a presence of an input to an absence of an input with respect to the touch panel 24, that is, means an end of the input to the touch panel 24. The sliding is an operation of continuing an input-present-state to the touch panel 24, and changing input position coordinates with the input-present-state continued.

Furthermore, the operation area defines a range for coordinates of an input position. Thus, it is determined whether or not input coordinates is present within the area defined by the operation area. Here, a plurality of areas may be defined as one condition. In addition, when the operation kind is determined to be a touch-off, since no coordinates are detected, it is determined whether or no the input coordinates detected immediately before is within the operation area.

For example, the condition data having the data ID of D01 is a forward condition of the operation item of the processing order 1 of the operation definition data having the processing ID of P01 as shown in FIG. 8. Since the first operation item is to "touch a card you want to arrange", with respect to the condition data, a touch-on is stored as an operation kind, and a display area of each card 100 is stored as a display area. Thus, in a case that the operation kind is a touch-on, and the input coordinates are included in the operation area, it is determined that the first operation item is executed. Additionally, in a case that a card 100 which has already been selected is present, the display area of the selected card 100 is excluded from the condition.

Furthermore, the condition data having the data ID of D04 is a forward condition of the processing order 2. Since the second operation item is to "slide the card to a place where you want to arrange", with respect to the condition data, sliding is stored as an operation kind, and a display area of each arrangement position 102 is stored as an operation area. Thus, in a case that operation kind is sliding and the input coordinates is included in the operation area, it is determined that the second operation item is executed. Additionally, in a case that an arrangement position 102 at which a card has already been arranged is present, the display area of the selected arrangement position 102 is excluded from the condition.

Furthermore, the condition data having the data ID of D02 is a forward condition of the processing order 3. Since the third operation item is to "touch off a touch pen", with respect to the condition data, a touch-off is stored as an operation kind, and a display area of each arrangement position 102 is stored as an operation area. Thus, in a case that the operation kind is a touch-off, and the input coordinates (coordinates immediately detected) are included in the operation area, it is determined that the third operation item is executed.

In addition, the condition data having a data ID of D03 is a backward condition of the processing order 2. Thus, with respect to the condition data, data for determining that the state attained by "touching a card you want to arrange" has not been maintained during execution of an operation of "sliding the card to a place where you want to arrange" is defined. More specifically, a touch-off is stored as an operation kind, and an area except for the display area of the arrangement position 102 is stored as an operation area. That is, it is determined whether or not an operation making a selection of a card 100 ineffective such as a release of the stick 26, etc. at a position except for the arrangement position 102 is performed. In a case that an arrangement position 102 which has been arranged exists, the display area of the selected arrangement position 102 is included in the condition.

Furthermore, the condition data having a data ID of D0S is a backward condition of the processing order 3. Thus, in the condition data, data capable of determining that the state attained by "sliding the card to a place where you want to arrange" has not been maintained during execution of an operation of "touching off a touch pen" is defined. More specifically, sliding is stored as an operation kind, and an area except for the display area of the arrangement position 102 is stored as an operation area. That is, it is determined whether or not an operation making a selection of an arrangement position 102 ineffective such as a movement of the stick 26, etc. to a position except for the arrangement position 102 is performed.

Thus, in this embodiment, it is determined whether or not the coordinate data input by the user by utilizing the touch panel 24 indicates a predetermined operation kind and a predetermined operation area, and therefore, it is possible to easily and appropriately determine an operation.

In addition, a memory area 218 shown in FIG. 7 stores image data for generating and displaying a screen. More specifically, image data of the card 100, an arrangement position 102, etc., image data for displaying letters representing a title of an operating procedure and a message of an operation item, image data of a background, etc. are included. In addition, the image data of the operation item includes image data for a normal display and image data for highlight.

Additionally, a data memory area 202 stores other data necessary for various flags, a counter, etc. as described above.

Figure 10:
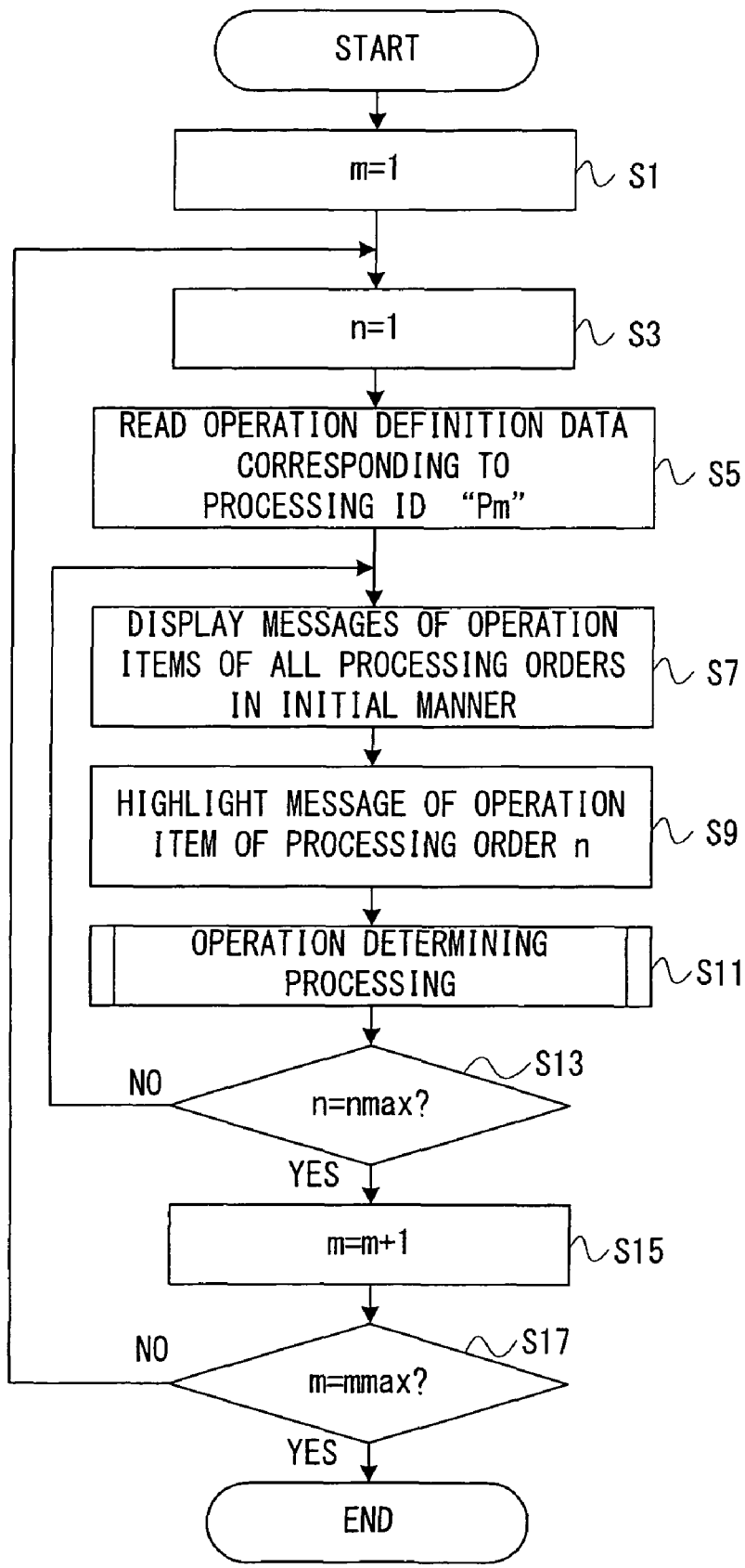
FIG. 10 is a flowchart showing one example of an operation of the game apparatus.

FIG. 10 shows one example of an operation of a game apparatus. It should be noted that since a determination of a user operation and a highlight of an operation item are main features of the present invention, in a flowchart shown in FIG. 10, etc. processing in relation to a display of an operation item, processing for determining an operation on the LCD 12 are mainly described, and processing in relation to a display of a card 100 and an arrangement position 102, etc. on the LCD 14 are omitted.

When starting the processing, the CPU core 34 stores one as an initial value in a variable m for designating an operating procedure to be applied in a step S1. More specifically, the variable m is in association with the number of the processing ID for each operating procedure of the operation definition data (FIG. 8). The program of this embodiment is constructed so as to apply a plurality of operating procedures in turn depending on the value of the variable m. If the variable m is one, the operation definition data corresponding to the processing ID of "P01", that is, the operation definition data of a method of arranging a card described above is read in a step S5 described later.

Next, in a step S3, the CPU core 34 stores one as an initial value in a variable n for designating a processing order. Thus, the first operation item is designated from the operating procedure.

Succeedingly, in the step S5, the CPU core 34 reads operation definition data corresponding to a processing ID of "Pm" from the ROM 28*a* to the memory area 214 of the RAM 42. In addition, condition data corresponding to the condition defined by the operation definition data of the processing ID of "Pm" may be read from the ROM 28*a* to the memory area 216 in the step S5, but condition data may be read when a condition determining processing is performed.

In succeeding steps S7 and S9, processing for displaying a message of an operation item is executed. In this embodiment, all the operation items are displayed in an initial manner (normal manner), and an operation item of a processing order n is highlighted, and whereby, only the current operation item is highlighted.

That is, in the step S7, the CPU core 34 first displays messages of the operation items of all the processing orders in an initial manner. More specifically, the CPU core 34 draws all the operation items in the initial manner in the VRAM 52 on the basis of message data of all the operation items, image data for initial manner, etc. by utilizing the GPU 44. Here, data necessary for display processing such as a display position of each operation item is stored in the ROM 28*a* in advance. Succeedingly, in the step S9, the CPU core 34 highlights the message of the operation item of the processing order n. More specifically, the CPU core 34 draws the operation item of the processing order n in a highlighted manner in the VRAM 52 by utilizing the GPU 44 on the basis of the message data of the operation item of the processing order n, the image data for highlight, etc. Thus, when the LCD controller 50 executes the display processing on the basis of the drawing data of the VRAM 52 at a display updating timing (for each frame) under the control of the CPU core 34, a screen in which only the operation item of the processing order n is highlighted, and the other operation items are normal-displayed is displayed on the LCD 12.

Next, in a step S11, the CPU core 34 executes operation determining processing. In the operation determining processing, it is determined whether or not the user executes a current operation item, or whether or not a state attained by executing a previous operation item has not been maintained. Then, depending on the result of the determination result, the value of the variable n for designating the processing order is changed, that is, an operation item to be currently executed is changed. The detail of an operation of the operation determining processing is shown in FIG. 11.

Figure 11:
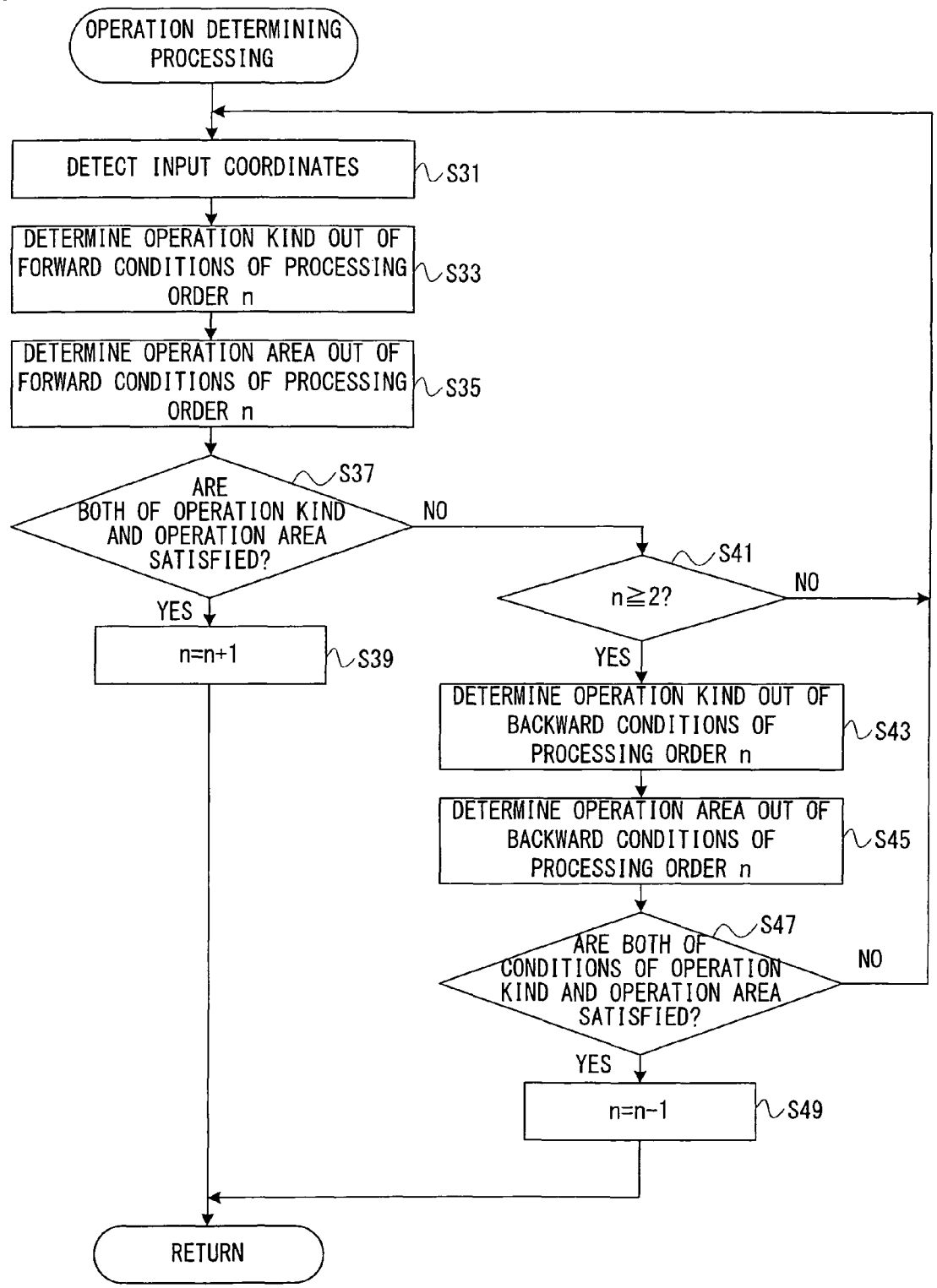
FIG. 11 is a flowchart showing one example of an operation of operation determining processing shown in FIG. 10.

When the operation determining processing is started, in a step S31 in FIG. 11, the CPU core 34 detects input coordinates. More specifically, data indicating the coordinates of the position input by the user is detected from the data fetched via the touch panel 24, and the coordinate data is stored in the memory area 212 by being brought into correspondence with a frame number, for example. It should be noted that in a case of no input, data indicating that there is no detection of input coordinates is stored. In the input coordinates memory area 212, histories by a predetermined number of frames including input coordinates of at least a current frame and a previous frame are stored.

Here, the input coordinate detecting processing (step S31) and determination processing of the condition of the operation item (step S33-S37, step S41-S47) are executed at regular time intervals (one frame, for example).

In the succeeding steps S33-S37, it is determined whether or not a current operation item is executed. That is, first, in the step S33, the CPU core 34 determines the operation kind out of the forward conditions of a processing order n. More specifically, the CPU core 34 determines whether or not an operation of the operation kind is performed on the basis of the input coordinate data in the memory area 212 with reference to the data ID of the forward condition stored in the operation definition data memory area 214 and with reference to the operation kind corresponding to the data ID stored in the condition data memory area 216. For example, in a case that the operation kind is a touch-on, it is determined whether or not input coordinates are detected at a current frame, and input coordinates are not detected at a previous frame. Alternatively, in a case that the operation kind is a touch-off, input coordinates are detected at the current frame, and input coordinates are not detected at the previous frame. Still alternatively, in a case that the operation kind is sliding, it is determined whether or not input coordinates are detected at both of the current and previous frames, and the input coordinates are changed.

In the succeeding step S35, the CPU core 34 determines an operation area out of the forward conditions of the processing order n. More specifically, the CPU core 34 decides an operation area to be used for a determination with reference to the operation area corresponding to the data ID of the forward condition stored in the condition data memory area 216. Then, it is determined whether or not the input coordinates at the current frame or the previous frame stored in the input coordinates memory area 212 is included in the operation area. Additionally, if the data ID is D01, an area of the card 100 which has already been selected is excluded from the operation area, and if the data ID is D04, an area of the arrangement position 102 where the card 100 has already been arranged is excluded from the operation area. Furthermore, the input coordinates at the previous frame is employed in the condition determination in a case that the operation kind is a touch-off.

Then, in the step S37, the CPU core 34 determines whether or not both of the conditions of the operation kind and the operation area are satisfied. If "YES" in the step S37, that is, if the forward condition is satisfied, the CPU core 34 increments the variable n for designating the processing order by one in a step S39. Thus, the processing order advances to a next order, that is, a next operation item is the operation item to be executed.

On the other hand, if "NO" in the step S37, that is, if the forward condition is not satisfied, in succeeding steps S41-S47, it is determined whether or not the state obtained by executing the previous operation item has not been maintained. That is, in the step S41, the CPU core 34 first determines whether or not the variable n for designating the processing order is equal to or more than two. That is, it is confirmed that the current operation item is not the first operation item. If "NO" in the step S41, that is, if the current operation item is the first operation item, and there is no previous operation item, the condition determination cannot be performed, so that the process returns to the step S31.

On the other hand, if "YES" in the step S41, that is, if there is a previous operation item, the CPU core 34 determines the operation kind out of the backward conditions of the processing order n in the step S43. More specifically, the CPU core 34 determines whether or not an operation of the operation kind is performed on the basis of the input coordinate data of the memory area 212 with reference to the data ID of the backward condition stored in the operation definition data memory area 214, and with reference to the operation kind corresponding to the data ID stored in the condition data memory area 216 similar to the step S33.

Next, in the step S45, the CPU core 34 determines an operation area out of the backward conditions of the processing order n. More specifically, the CPU core 34 decides an operation area to be used for a determination with reference to the operation area corresponding to the data ID of the backward condition stored in the condition data memory area 216 similar to the step S35. Then, it is determined whether or not the input coordinates at the current frame or the previous frame which are stored in the input coordinates memory area 212 are included in the operation area.

Then, in the step S47, the CPU core 34 determines whether or not both of the conditions of the operation kind and the operation area are satisfied. If "NO" in the step S47, that is, if the backward condition is not satisfied, the process returns to the step S31 in order to continue to determine the current operation item.

On the other hand, if "YES" in the step S47, that is, if the backward condition is satisfied, the CPU core 34 decrements the variable n for designating the processing order by one in a step S49. Thus, the processing order is returned to a previous order, that is, a previous operation item is the operation item to be executed.

After completion of the steps S39 or step S49, the operation determining processing is ended, and the process returns to a step S13 in FIG. 10. Thus, in a case that there is any change in the value of the variable n, the operation determining processing is ended.

In the step S13 shown in FIG. 10, the CPU core 34 determines whether or not the variable n for designating the processing order is equal to a predetermined value nmax, that is, whether or not the last operation item is executed. Here, the predetermined value nmax can be calculated by detecting the maximum value of the processing order from the data having the processing ID of Pm with reference to the operation definition data, and adding one to the maximum value, for example.

If "NO" in the step S13, that is, if there is any change to an operation item except for the last operation item, the process returns to the step S7 in order to change the highlight. Thus, if the forward condition is satisfied in the operation determining processing in the step S11, a next operation item is highlighted, and if the backward condition is satisfied, a previous operation item is highlighted.

On the other hand, if "YES" in the step S13, that is, if the operating procedure is completed after the last operation item is executed, the CPU core 34 increments the variable m for designating a procedure by one in a step S15. Then, in a step S17, it is determined whether or not the value of the variable m is equal to a predetermined value mmax, that is, whether or not all the operating procedures have been executed. Here, since the user has to execute a predetermined number of operating procedures depending on a circumstance and a scene of the game, the predetermined value mmax is stored in the ROM 28a in advance. If "NO" in the step S17, that is, if any operating procedure is left, the process returns to the step S3 in order to execute a next operating procedure. On the other hand, if "YES" in the step S17, that is, if executions of all the operating procedures have been completed, the processing is ended.

According to this embodiment, a current operation item out of a series of operating procedures is highlighted, and when the current operation item is executed, a next operation item is highlighted while when a state attained by execution of a previous operation item has not been maintained, the previous operation item is highlighted. Thus, it is possible to inform the user whether or not the previous operation item has not been maintained, and whether or not the previous operation item has to be started from the beginning.

Figure 12:
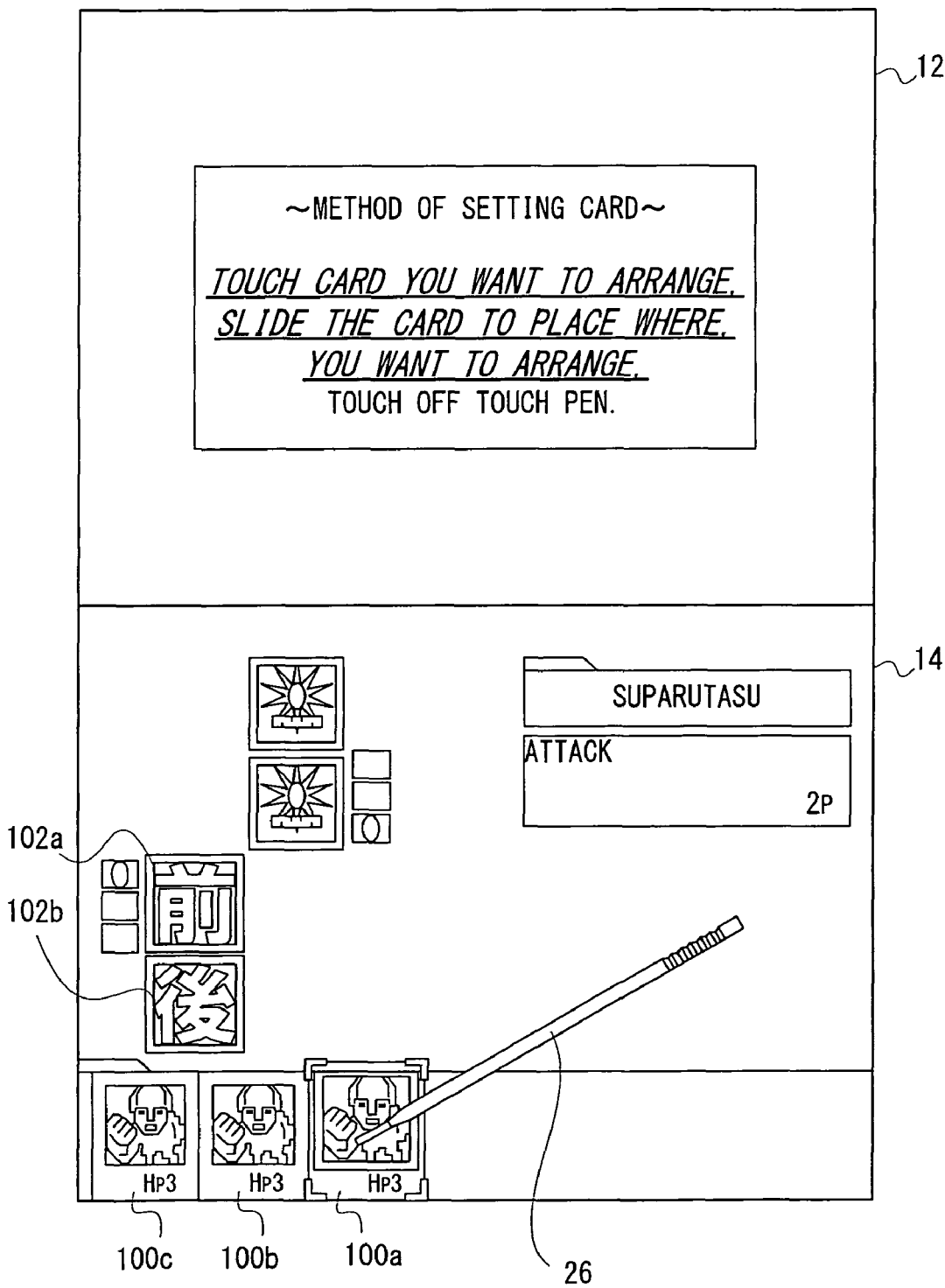
FIG. 12 is an illustrative view showing a screen of another embodiment in which a highlight is increased for each execution of an operation item.

Additionally, in the above-described embodiment, in a case that a current operation item is executed, the highlight of the executed operation item is erased, and a next operation item is highlighted. However, in another embodiment, every time that execution of an operation item is finished, an operation item to be highlighted may be increased. That is, in a case that a current operation item is executed, a next operation item may be highlighted without the highlight of the executed operation item being changed. For example, in a case that the card 100a is touched in a state of FIG. 3, that is, in a case that the first operation item is executed, the highlight of the first operation item is continued as shown in FIG. 12, and the second operation item is highlighted anew. In this embodiment, since the executed operation item and the operation item to be currently executed are highlighted, and an operation item to be executed later is normal-displayed, the highlight sandwiched between the highlight and the normal display can inform the user of the operation item to be currently executed.

Figure 13:
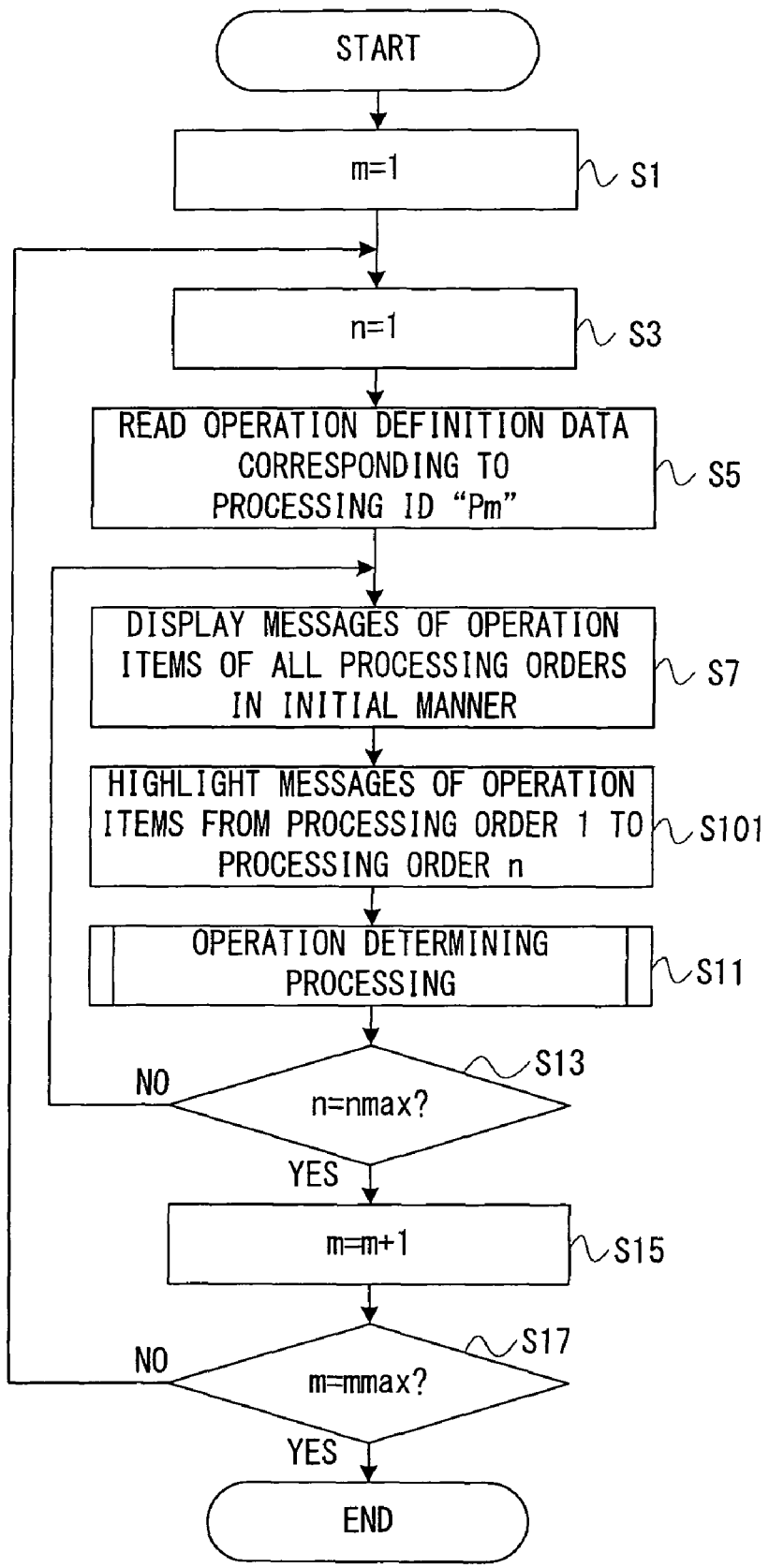
FIG. 13 is a flowchart showing one example of an operation in a case of FIG. 12 embodiment.

FIG. 13 shows one example of on an operation of this embodiment. Here, in the processing of FIG. 13, the same reference numerals are applied to processing similar to that in the above-described FIG. 10, and the explanation thereof will be omitted. In the embodiment of above-described FIG. 10, every time that a current operation item is changed, after all the operation items are drawn in an initial (normal display) manner, the current operation item is drawn in a highlighted manner. Accordingly, in a step S101 after the step S7, in order to increase a highlight, the CPU core 34 may highlight messages of the operation items from the processing order 1 to the processing order n.

Additionally, in the embodiment of highlighting only a current operation item as shown in FIG. 10, when a current operation item is changed, after all the operation items are normal-displayed once, the current operation item is drawn in a highlighted manner. However, in another embodiment of highlighting only a current operation item, drawing processing may be performed on the operation item which is required to be changed in a displaying manner.

Figure 14:
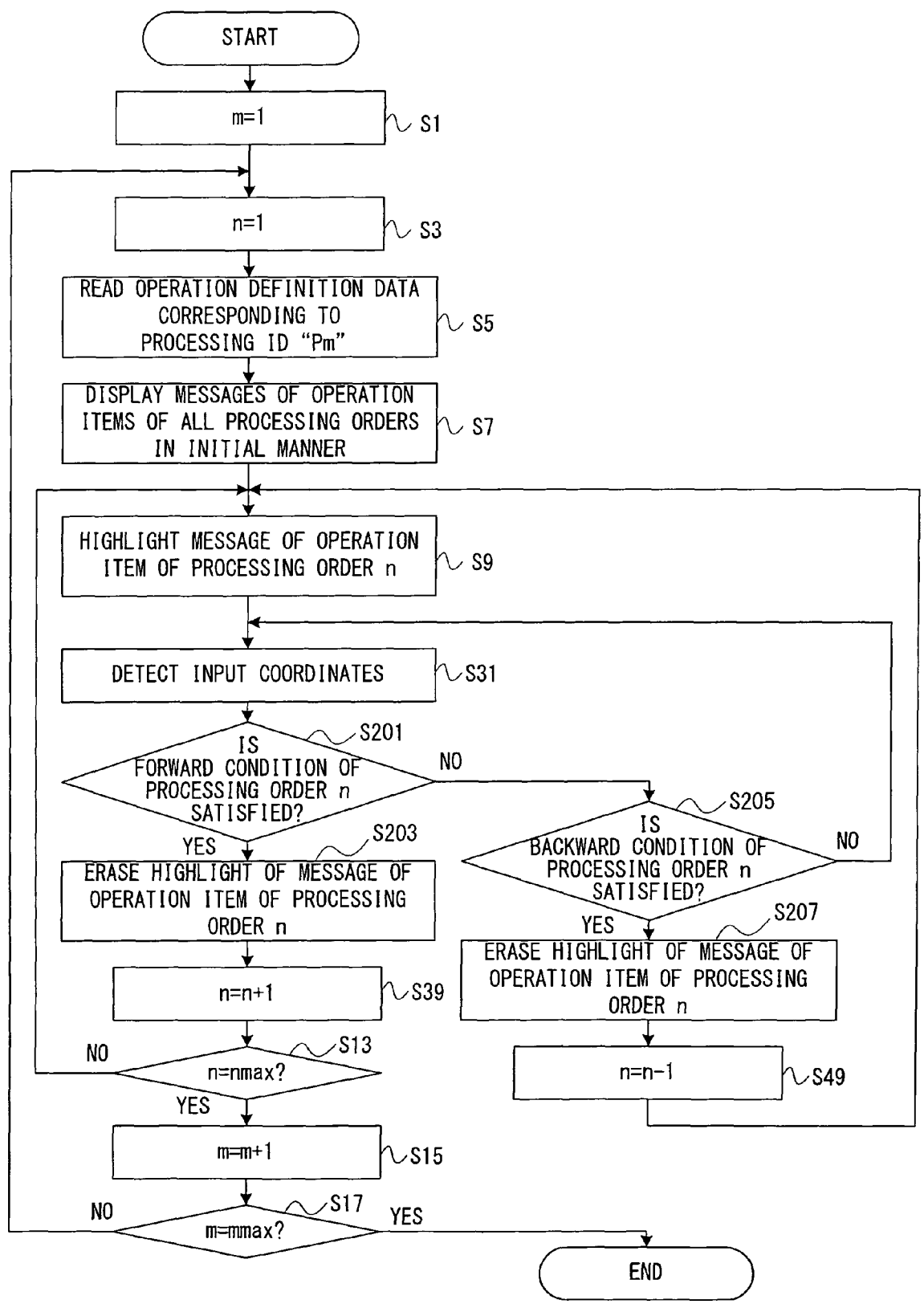
FIG. 14 is a flowchart showing one example of an operation of a still another embodiment in which a highlight of an operation item is changed by erasure.

FIG. 14 shows one example of an operation of this embodiment. It should be noted that in FIG. 14 processing, the same reference numerals are applied to the processing similar to that in the above-described FIG. 10 and FIG. 11, and therefore, the detailed description therefor is omitted here. Furthermore, in a step S201 after the step S31, it is determined whether or not a forward condition of a processing order n is satisfied. The processing in the step S201 is similar to the processing from the step S33 to the step S37 in FIG. 11, and collectively represents these processing. In addition, in a step S205 executed if "NO" in the step S201, it is determined whether or not a backward condition of the processing order n is satisfied. The processing in the step S205 is similar to the processing from the step S41 to the step S47 in FIG. 11, and collectively represents these processing.

If "YES" in the step S201, that is, if the current operation item is executed, the CPU core 34 erases the highlight of the message of the operation item having the processing order n in a step S203. More specifically, the CPU core 34 draws the message of the operation item having the processing order n in an initial (normal display) manner in the VRAM 52 by utilizing the GPU 44. After completion of the processing in the step S203, the process proceeds to the step S39. If "NO" in the step S13, the processing is returned to the step S9 not to the step S7. Accordingly, a next operation item is highlighted. It should be noted that as shown in FIG. 14, in a case that the step S203 is executed after the step S201, when the last operation item is executed, the highlight of the last operation item is erased, and therefore, all the operation items are normal-displayed. Since the execution of the operating procedures have been completed, such displaying processing does not present a specific problem, but if the highlight of the last operation item is desired to be left, the processing in the step S203 may be executed if "NO" in the step S13.

On the other hand, if "NO" in the step S201, the determination in the step S205 is performed. If "YES" in the step S205, that is, if a state attained by execution of the previous operation item has not been maintained, the CPU core 34 erases the highlight of the message of the operation item having the processing order n in a step S207. After completion of the step S207, the processing proceeds to the step S49 and then returns to the step S9.

Additionally, in each of the above-described embodiments, in a case that the state attained by execution of a previous operation item has not been maintained, the previous operation item is regarded as a current operation item. This is because that an operating procedure in which an operation item which has not been maintained during execution of the current operation item is limited to the previous operation item is assumed. However, in another embodiment, in a case that it is determined that a previous operation item has not been maintained, by detecting the maintained operation item backwards, an operation item next to the operation item may be regarded as a current operation item.

Figure 15:
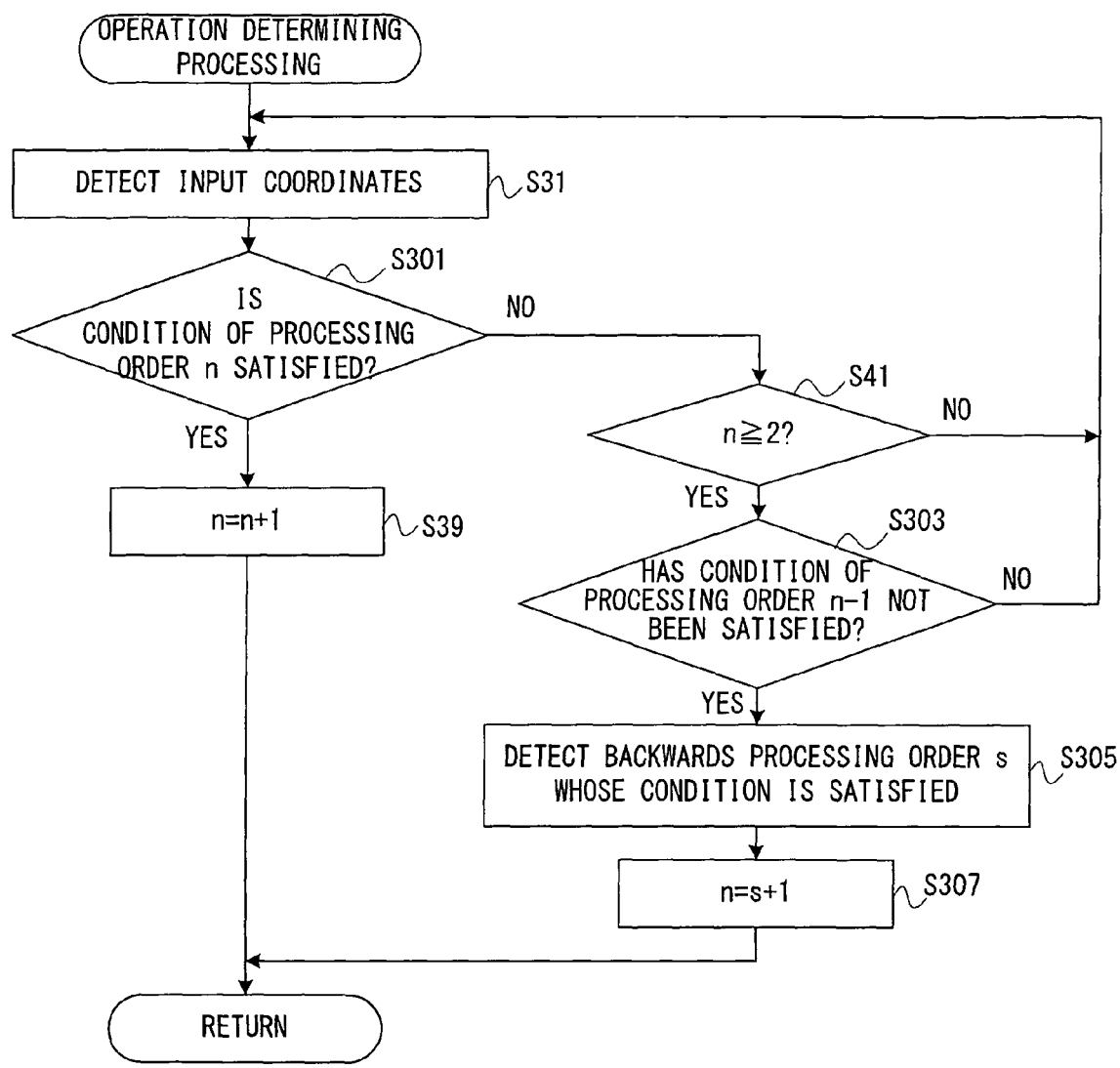
FIG. 15 is a flowchart showing one example of operation determining processing in the still another embodiment in which the highlight is returned to a next operation item in a processing order about which a condition is satisfied in a case that a previous operation item has not been maintained.

One example of operation determining processing out of the operations in this embodiment is shown in FIG. 15. It should be noted that in the processing in FIG. 15, the same reference numerals are applied to the processing similar to that in the above-described FIG. 11, and therefore, the detailed description therefor is omitted here.

After completion of the step S31, in a step S301, the CPU core 34 determines whether or not a condition of a processing order n is satisfied. The condition of the processing order n is a condition for determining whether or not the relevant operation item is executed. The condition corresponds to a forward condition of each operation item in each of the above-described embodiments. Like the above-described forward condition, in a case that the condition includes the operation kind and the operation area, the both of the condition are required to be satisfied. If "YES" in the step S301, since the current operation item is executed, the process proceeds to the step S39. On the other hand, if "NO" in the step S301, the CPU core 34 determines whether or not the value of the variable n is equal to or more than two in the step S41.

If "YES" in the step S41, that is, if a previous operation item is present, the CPU core 34 determines whether or not a condition of a processing order n−1 (that is, previous operation item) has not been maintained in a step S303. The condition of the processing order n−1 determined in the step S303 may be the same as the condition for determining whether or not the operation item is executed or may be another condition. In the step S303, since whether or not the state attained by execution of the processing order n−1 has not been maintained is determined, a condition for allowing such a determination is set. In a case that the condition includes the operation kind and the operation area, when both of the conditions have not been satisfied, for example, it is determined that the condition of the processing order n−1 has not been satisfied, and when one of the condition is satisfied, it is determined that the condition of the processing order n−1 is maintained. Or, in a case that another condition like the above-described backward condition is prepared, when the backward condition is satisfied, it is determined that the condition of the processing order n−1 has not been satisfied. Additionally, in a case that the backward condition includes the operation kind and the operation area, both of the conditions of the operation kind and the operation area have to be satisfied for the purpose of the backward condition being satisfied. If "NO" in the step S303, the process returns to the step S31 in order to continue the determination of the current operation item.

On the other hand, if "YES" in the step S303, that is, if the previous operation item has not been maintained, the CPU core 34 detects backwards a processing orders whose condition is satisfied in a step S305. More specifically, the processing order is subtracted by one, and a determination similar to the step S303 is performed with respect to the processing order. Then, the processing order s when the condition of the processing order is maintained is detected. It should be noted that in a case that n=2, since the condition determination of the processing order 1 has already been executed in the step S303, and it is already determined that the condition of the first operation item has not been satisfied, S=0 is detected in the step S305 in order that the first operation item is adopted as a current operation item.

In a succeeding step S307, a value obtained by adding one to the detected order s is substituted in the variable n for designating the current operation item. That is, an operation item next to the operation item whose condition is maintained is set to the current operation item, so that the operation item next to the operation item whose condition is maintained is highlighted. After completion of the step S307, the operation determining processing is ended.

Additionally, in each of the above-described embodiments, a highlight manner (second manner) is differentiated in color, style, etc. from the normal display manner (first manner). However, in another embodiment, the first manner may be a still state, and the second manner may be a dynamic state such as movement, waving, rolling, etc. of a letter string and letters. In this case, animation data, etc. for dynamically displaying a message indicating an operation item is stored in advance as image data.

Furthermore, in each of the above-described embodiments, as a pointing device for instructing an arbitrary position on the screen, the touch panel 24 is used, but in another embodiment, other pointing devices such as a pen tablet, a touch pad, a computer mouse, etc. may be used. However, in order to clearly inform the user of the instructed position, an instruction image like a mouse pointer is displayed. Furthermore, in a case of a mouse, in accordance with turning on or off the mouse button, the presence or absence of an input may be identified.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A storage medium storing a program to be executed in a computer of an information processing apparatus having an input and a display, and causing a user to perform an operation according to a series of operating procedures by said input, wherein said program causes said computer to execute:

displaying a plurality of operation items making up said series of operating procedures on said display in a first manner, and displaying at least a current operation item out of said plurality of operation items on said display in a second manner different from said first manner, determining whether or not said current operation item is executed on the basis of input data from said input, changing a display of a next operation item to the second manner when it is determined that said current operation item is executed by determining whether or not said current operation item is executed on the basis of input data from said input;

determining whether or not a state attained by execution of a previous operation item has not been maintained on the basis of the input data from said input, and changing a display of said current operation item to the first manner when it is determined that the state attained by said previous operation item has not been maintained on the basis of the input data from the input.

2. A storage medium storing a program according to claim 1, wherein said changing a display of a next operation item changes a display of a next operation item to the second manner and changes the display of said current operation item to the first manner when it is determined that said current operation item is executed, and wherein said changing a display of said current operation item changes the display of said current operation item to the first manner and changes the display of said previous operation item to the second manner when it is determined that a state attained by execution of said previous operation item has not been maintained.

3. A storage medium storing a program according to claim 1, wherein said changing a display of a next operation item displays the operation items from a first operation item to a next operation item in the second manner when it is determined that said current operation item is executed.

4. A storage medium storing a program according to claim 1, wherein said determining whether or not said current operation item is executed is determined on the basis of the input data from said input and a first condition stored in advance for advancing said current operation item to the next operation item, and said determining whether or not a state attained by execution of a previous operation item has not been maintained is determined on the basis of the input data from said input and a second condition stored in advance for returning said current operation item to the previous operation item.

5. A storage medium storing a program according to claim 1, wherein said input is a pointing device for instructing an arbitrary position on a screen to be displayed on said display, and inputting coordinate data of the instructed position, said determining whether or not said current operation item is executed determines whether or not an operation kind is a predetermined state on the basis of said coordinate data, determines whether or not an operation area is a predetermined area, and determines said current operation item is executed in a case that both of the operation kind and the operation area are satisfied, and said determining whether or not a state attained by execution of a previous item has not been maintained determines whether or not the operation kind is the predetermined state on the basis of said coordinate data, determines whether or not the operation area is the predetermined area, and determines that a state attained by execution of said previous operation item has not been maintained in a case that both of the operation kind and the operation area are satisfied.

6. An information processing apparatus having an input and a display, and causing a user to perform an operation according to a series of operating procedures by said input, comprising:

an operation item display generator for displaying a plurality of operation items making up of said series of operating procedures on said display in a first manner, and displaying at least a current operation item out of said plurality of operation items on said display in a second manner different from said first manner, a first processing determiner that determines whether or not said current operation item is executed on the basis of input data from said input, a first display changer for changing a display of a next operation item to the second manner when it is determined that said current operation item is executed by said first processing determiner, a second processing determiner that determines whether or not a state attained by execution of a previous operation item has not been maintained on the basis of the input data from said input means, and a second display changer for changing a display of said current operation item to the first manner when it is determined that the state attained by said previous operation item has not been maintained by said second processing determiner.

* * * * *